(12) United States Patent
Osawa et al.

(10) Patent No.: US 10,384,276 B2
(45) Date of Patent: Aug. 20, 2019

(54) INSERT TYPE TOOL AND THREAD MILL

(71) Applicant: OSG CORPORATION, Toyokawa-shi, Aichi (JP)

(72) Inventors: Jiro Osawa, Toyokawa (JP); Tomonori Yoda, Toyohashi (JP)

(73) Assignee: OSG CORPORATION, Toyokawa-shi, Aichi (JP)

( * ) Notice: Subject to any disclaimer, the term of this patent is extended or adjusted under 35 U.S.C. 154(b) by 2 days.

(21) Appl. No.: 15/572,096

(22) PCT Filed: Jun. 15, 2015

(86) PCT No.: PCT/JP2015/067161
§ 371 (c)(1),
(2) Date: Nov. 6, 2017

(87) PCT Pub. No.: WO2016/203519
PCT Pub. Date: Dec. 22, 2016

(65) Prior Publication Data
US 2018/0117685 A1    May 3, 2018

(51) Int. Cl.
*B23C 5/10*      (2006.01)
*B23C 5/18*      (2006.01)
*B23G 5/18*      (2006.01)

(52) U.S. Cl.
CPC .............. *B23C 5/109* (2013.01); *B23C 5/10* (2013.01); *B23G 5/18* (2013.01); *B23C 2210/02* (2013.01);
(Continued)

(58) Field of Classification Search
CPC .......... B23C 2210/02; B23C 2210/246; B23C 2210/244; B23C 2240/24; B23G 5/18; B23G 2200/10; B23G 2200/12
See application file for complete search history.

(56) References Cited

U.S. PATENT DOCUMENTS 53,496 A *    3/1866   Smith ............................ 407/31
1,725,299 A   8/1929   Pickin
(Continued)

FOREIGN PATENT DOCUMENTS

CN    1025484 C     7/1994
CN    201543918 U   8/2010
(Continued)

OTHER PUBLICATIONS

English translation of International Search Report of International Application No. PCT/JP2015/067161.
(Continued)

*Primary Examiner* — Alan Snyder
(74) *Attorney, Agent, or Firm* — Muncy, Geissler, Olds & Lowe, P.C.

(57) ABSTRACT

An insert portion (3) of a thread mill (1A) is fixed to a leading end portion of a body (2A) using screws (8). The insert portion (3) is configured by overlaying an insert (4) for finish machining and an insert (5) for rough machining. On respective mating faces of the inserts (4, 5), convex portions and concave portions of the mating face of the insert (4) are overlaid with concave portions and convex portions of the mating face of the insert (5). The thread mill (1A) can cut a female screw in a hole formed in a workpiece by performing right-hand cut down-cut milling, for example. The inserts (4, 5) simultaneously cut an inner peripheral surface of the hole, and the rough machining and the finish machining can thus be performed in a single pass. By the convex portions and the concave portions of the respective mating faces of the inserts (4, 5) being overlaid with each other, the inserts (4, 5) partially overlap in their respective thickness directions. As a result, a protrusion length of the insert portion (3) can be shortened.

11 Claims, 28 Drawing Sheets

(52) U.S. Cl.
CPC .. *B23C 2210/207* (2013.01); *B23C 2210/246* (2013.01); *B23C 2240/24* (2013.01); *B23G 2200/10* (2013.01); *B23G 2200/12* (2013.01)

(56) References Cited

U.S. PATENT DOCUMENTS

| | | | |
|---|---|---|---|
| 2,658,261 A * | 11/1953 | Junker | B23C 5/04 |
| | | | 407/31 |
| 4,218,159 A | 8/1980 | Langen | |
| 5,279,344 A | 1/1994 | Rautio | |
| 2011/0311327 A1 * | 12/2011 | Harif | B23C 5/109 |
| | | | 407/42 |
| 2012/0093602 A1 | 4/2012 | Osawa et al. | |
| 2012/0321397 A1 | 12/2012 | Sjoo | |
| 2013/0272807 A1 | 10/2013 | Luik et al. | |
| 2013/0321397 A1 | 12/2013 | Chen et al. | |

FOREIGN PATENT DOCUMENTS

| | | |
|---|---|---|
| CN | 102458742 A | 5/2012 |
| CN | 102837078 A | 12/2012 |
| DE | 102004023710 A1 | 12/2005 |
| DE | 102005029758 B3 | 1/2007 |
| DE | 102010054392 A1 | 6/2012 |
| DE | 102011055210 A1 | 5/2013 |
| JP | S49-37887 U | 4/1974 |
| JP | H13-270816 A | 12/1991 |
| JP | H15-78464 U | 10/1993 |
| JP | 2010-284752 A | 12/2010 |
| JP | 2012-179685 A | 9/2012 |
| WO | 2006136338 A1 | 12/2006 |

OTHER PUBLICATIONS

Written Opinion of the International Searching Authority of International Application No. PCT/JP2015/067161 and English translation thereof.
Taiwanese Office Action dated May 8, 2017 (Taiwanese Patent Application No. 105118592 based on the International Application No. PCT/JP2015/067161) and English translation thereof.
Taiwanese Decision of Rejection dated Sep. 7, 2017 (Taiwanese Patent Application No. 105118592 based on the International Application No. PCT/JP2015/067161) and English translation thereof.
English translation of International Preliminary Report on Patentability (Chapter II of the Patent Cooperation Treaty) of International Application No. PCT/JP2015/067161 and English translation thereof.
Office Action of the corresponding CA application No. 2983379 dated Dec. 11, 2018.
Extended European Search Report of the corresponding EP application No. 15895540 dated Jan. 21, 2019.

\* cited by examiner

Fig. 25
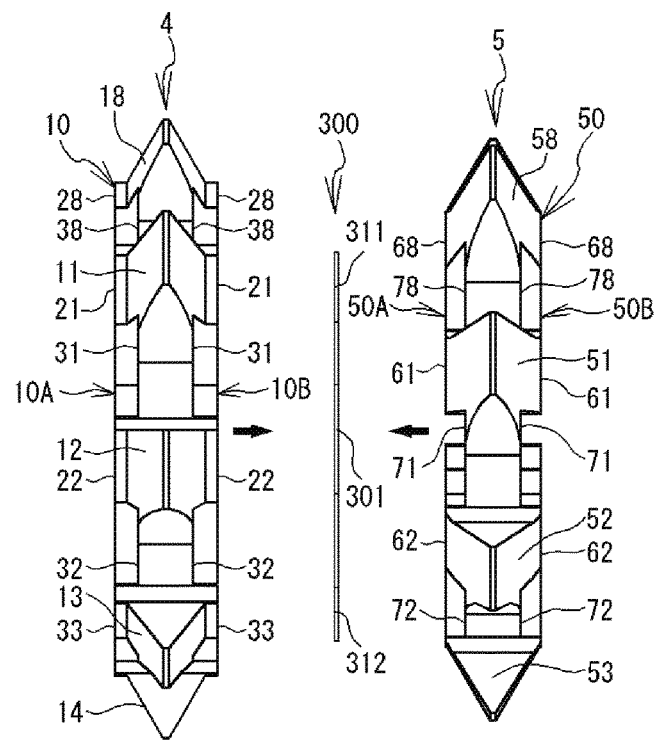
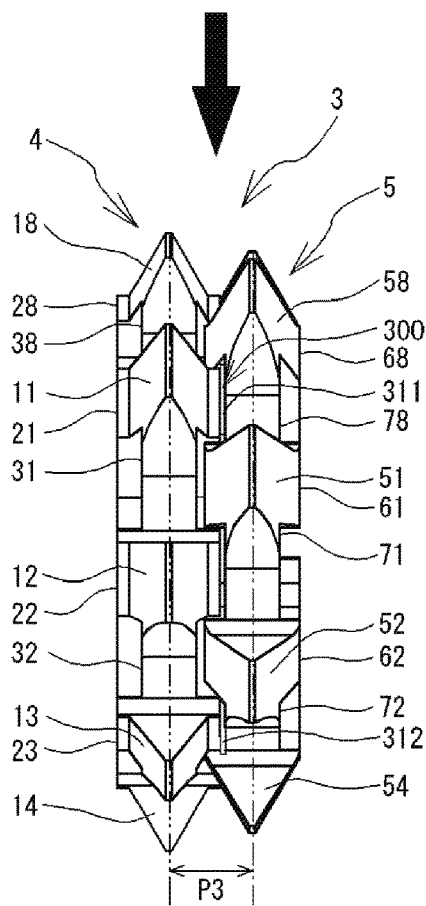

INSERT TYPE TOOL AND THREAD MILL

TECHNICAL FIELD

The present invention relates to an insert type tool and a thread mill that include a body and an insert portion that is attached to the body.

BACKGROUND ART

A machining head replacement type rotary tool is proposed in which a holder and a machining head are integrally connected to each other by a fastening male screw and a fastening female screw (see Patent Literature 1, for example).

CITATION LIST

Patent Literature

Patent Literature 1: Japanese Laid-Open Patent Publication No. 2010-284752

SUMMARY OF INVENTION

With the machining head replacement type rotary tool described in Patent Literature 1, there is a problem in that usage applications are limited by a shape of the holder. Further, the machining head replacement type rotary tool can use machining heads of a variety of shapes, but as a number of the machining heads that can be attached is one, it is not possible to perform combined machining, such as simultaneously performing rough machining and finish machining, for example.

It is an object of the present invention to provide an insert type tool and a thread mill capable of being applied to a variety of usage applications and allowing combined machining.

According to a first aspect of the present invention, an insert type tool includes a cylindrical body, a disc-shaped insert portion, and a fixing means that detachably fixes the insert portion to one end portion in an axial direction of the body, wherein the insert portion can be configured by a single disc-shaped insert or by a plurality of the inserts coaxially overlaid with each other, an outer periphery of the insert including blade portions, the insert, on each of both faces, includes convex portions respectively protruding from a center in a thickness direction of the insert to both sides in the thickness direction, the convex portions being most separated from the center, and concave portions provided in sections excluding the convex portions, the concave portions respectively protruding from the center to the both sides in the thickness direction, and the concave portions being lower than the convex portions, and when the plurality of the inserts are coaxially overlaid with each other, on each of mating faces of a first insert and a second insert that are overlaid with each other, the convex portions provided on the mating face of the first insert are inserted in the concave portions provided in the mating face of the second insert, and the convex portions provided on the mating face of the second insert are inserted in the concave portions provided in the mating face of the first insert.

In the insert type tool according to the first aspect, the insert portion can be configured by coaxially overlaying a plurality of the inserts. Thus, by overlaying the plurality of inserts of different types, combined machining can be performed on a workpiece. In addition, by changing a combination of the inserts in the insert portion, it is possible to expand variations of the combined machining. Since the insert portion can also be configured by the single insert, the appropriate single insert depending on a usage application can be attached to the one end portion of the body and used. On the respective mating faces of the first insert and the second insert that are overlaid with each other, the convex portions of the first insert are inserted into the concave portions of the second insert, and the convex portions of the second insert are inserted into the concave portions of the first insert. The first insert and the second insert partially overlap in their respective thickness directions. Thus, when the first insert and the second insert are overlaid, the thickness of the insert portion is smaller than a sum of the individual thicknesses of the first insert and the second insert. As a result, the first aspect can shorten a protrusion length of the insert portion, and can thus improve tool rigidity. Further, the first aspect can suppress run-out occurring at a time of rotation.

In the first aspect, the convex portions may be provided between the blade portions and a center portion of the insert. In the first aspect, the thick convex portions of the insert can be arranged corresponding to the blade portions provided on the outer periphery of the insert, and it is thus possible to improve rigidity of an outer periphery section of the insert that supports the blade portions.

In the first aspect, a shaft hole may be provided in the center portion of the insert, the shaft hole penetrating in the thickness direction, a contact face may be provided on the one end portion of the body, the contact face being in contact with one face of the insert, and a boss may be provided in a center of the contact face, the boss protruding along the axial direction of the body, and the boss being inserted in the shaft hole. When the insert is fixed to the one end portion of the body, the boss on the body side can be inserted in the shaft hole of the insert, and can be fixed by the fixing means in a state in which the one face of the insert is caused to be in contact with the contact face on the body side. As a result, in the first aspect, an attachment operation of the insert to the body can be efficiently performed, since the insert can easily be positioned with respect to the one end portion of the body.

In the first aspect, the contact face may include body side convex portions protruding to the one face side in positions corresponding to the concave portions provided in the one face, the body side convex portions being inserted in the concave portions, and body side concave portions provided to be lower than the body side convex portions in positions corresponding to the convex portions provided on the one face, the convex portions being inserted in the body side concave portions. When the one face of the insert is caused to be in contact with the contact face, the convex portions provided on the one face of the insert can be inserted in the body-side concave portions provided in the contact face. As a result, the first aspect can further shorten the protrusion length of the insert portion.

In the first aspect, the fixing means may be a screw, an insertion hole may be provided in the insert, the insertion hole penetrating in the thickness direction, and a shaft portion of the screw being to be inserted in the insertion hole, and a screw hole may be provided in the contact face in a position corresponding to the insertion hole, the screw being to be tightened in the screw hole. Thus, in the first aspect, the insert can be strongly fixed to the body.

In the first aspect, leading end portions of the convex portions provided on the mating face of the first insert may be in contact with bottom portions of the concave portions provided in the mating face of the second insert, and leading end portions of the convex portions provided on the mating face of the second insert may not be in contact with bottom portions of the concave portions provided in the mating face of the first insert. As a result, in the first aspect, the mating face of the first insert and the mating face of the second insert can be overlaid in parallel to each other without any wobble, and thus, the thickness of the insert portion configured by the plurality of inserts can be made uniform.

In the first aspect, on each of the both faces of the insert, the number of the convex portions and the number of the concave portions may be the same number n, and when a minimum angle indicated by two first virtual straight lines when the two first virtual straight lines from the center portion of the insert contact outermost peripheral edge portions of the convex portion and include a whole of the convex portion between the two first virtual straight lines is X, and a maximum angle between two second virtual straight lines when the two second virtual straight lines from the center portion contact outermost peripheral edge portions of the concave portion and do not include the convex portion between the two second virtual straight lines is Y, then: X may be less than Y, a sum of Xs of then number of convex portions may be less than 180°, a sum of Ys of the n number of concave portions may be greater than 180°, among Xs of the n number of convex portions, a maximum angle Xmax may be less than 180/n°, and among Ys of then number of concave portions, a maximum angle Ymax may be greater than 180/n°. As a result, the convex portions and the concave portions provided on each of both faces of the insert can be overlaid with the concave portions and the convex portions of the other insert, even if the insert is reversed.

In the first aspect, the insert portion may be configured by coaxially overlaying a rough machining insert and a finish machining insert with each other, the rough machining insert being the insert including blade portions to be used for rough machining, and the finish machining insert being the insert including blade portions to be used for finish machining. Thus, in the first aspect, the combined machining in which the rough machining and the finish machining are performed simultaneously can be performed on the workpiece.

In the first aspect, when the insert portion is configured by overlaying a plurality of the inserts, a pitch may be adjustable by replacing one of the inserts with an insert having a different thickness, the pitch being a distance in a direction parallel to the axial direction between blade portions provided on a periphery of the first insert and blade portions provided on a periphery of the second insert. In this way, in the first aspect, the pitch can be easily adjusted by overlaying the inserts having different thicknesses in the insert portion.

The first aspect may further include a plate-shaped spacer placed between the first insert and the second insert. In the first aspect, the pitch of the insert portion can be easily changed by placing the spacer between the first insert and the second insert. Further, the pitch can be easily adjusted by overlaying the spacer having a different thickness.

A thread mill according to a second aspect of the present invention includes the configuration of the insert type tool according to any one of claims 1 to 10. In this way, the thread mill of the second aspect can achieve the effects according to any one of the claims 1 to 10.

BRIEF DESCRIPTION OF THE DRAWINGS

FIG. 25 is a diagram showing a method of creating the insert portion 3 by placing a spacer 300 between the inserts 4 and 5.

MODES FOR CARRYING OUT THE INVENTION

Hereinafter, an embodiment of the present invention will be explained with reference to the drawings. The present invention is not limited to any of the specific configurations of the embodiment explained below.

Figure 1:
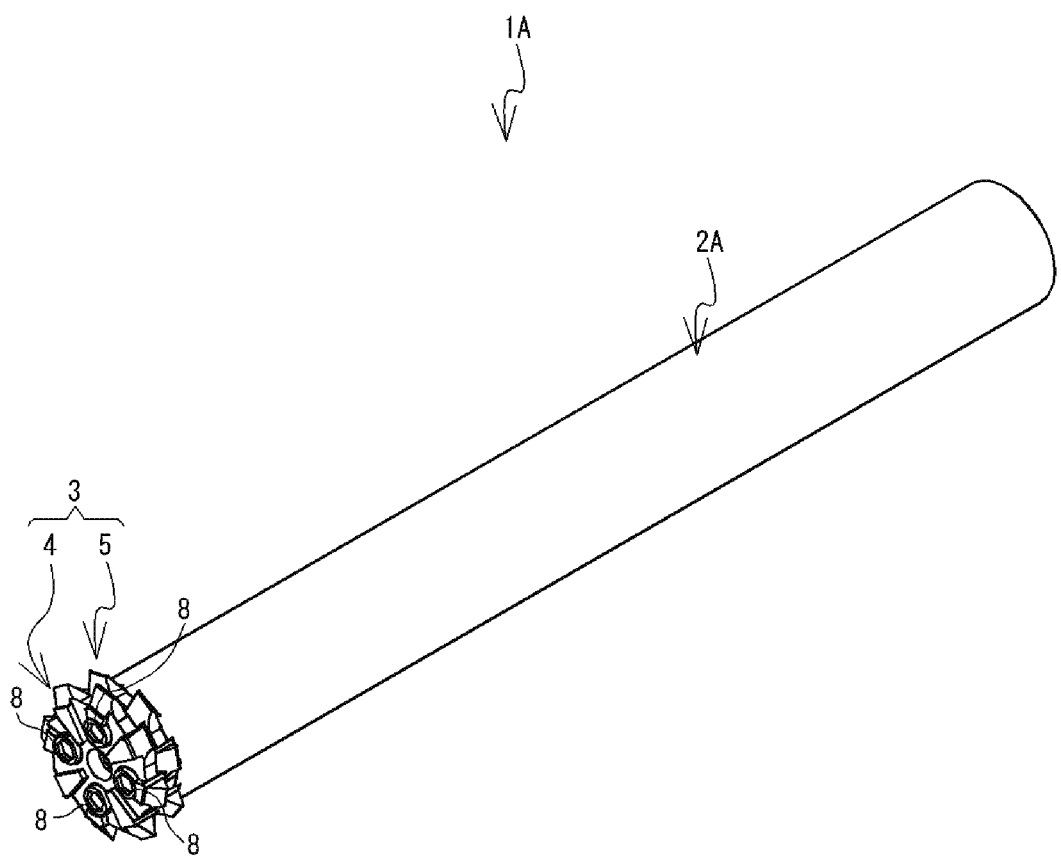
FIG. 1 is an overall perspective view of a thread mill 1A.

A structure of a thread mill 1A will be explained with reference to FIG. 1. The thread mill 1A is a tool for cutting a female screw, by milling, in a hole 6 provided in a workpiece 7 (refer to FIG. 22). The thread mill 1A is an insert type tool and includes a substantially cylindrical body 2A and an insert portion 3 that is detachably fixed to a leading end portion (one end portion in an axial direction) of the body 2A. The body 2A is a shank that is attached to a main shaft or the like of a machine tool (not shown in the drawings) and is rotationally driven. For example, carbon steel, alloyed steel, or the like, whose wear resistance, hardness, strength, etc. are lower than those of inserts 4 and 5 that configure the insert portion 3 and that will be described below, can be used as the material of the body 2A.

The insert portion 3 is detachably fixed, using four screws 8, to the leading end portion of the body 2A. The insert portion 3 is configured by one disc-shaped insert or by a plurality of coaxially overlaid disc-shaped inserts. The insert portion 3 shown in FIG. 1 is configured by coaxially overlaying the two inserts 4 and 5. The inserts 4 and 5 are formed of a specified material, such as cemented carbide, ceramic, high speed tool steel, or the like. Further, as necessary, the inserts 4 and 5 may be coated with a compound coating, such as TiN, TiCN, TiAlN, CrN, etc., or a hard coating, such as a diamond-like carbon (DLC) film, a diamond coating, etc., or may be subjected to steam treatment, nitriding treatment, or the like.

As the inserts 4 and 5, for example, inserts having mutually different usage applications can be used. The insert 4 is used for finish machining and the insert 5 is used for rough machining. The insert portion 3 is provided with the insert 4 on the leading end side in the axial direction, and with the insert 5 on the rear end side in the axial direction. The thread mill 1A that includes this type of the insert portion 3 is used as a tool to cut a right-hand thread, using right-hand cut down-cut milling, in the hole 6 provided in the workpiece 7 (refer to FIG. 22). This thread mill 1A can perform combined machining in which the rough machining and the finish machining are simultaneously performed in one pass of the right-hand cut down-cut milling.

Figure 2:
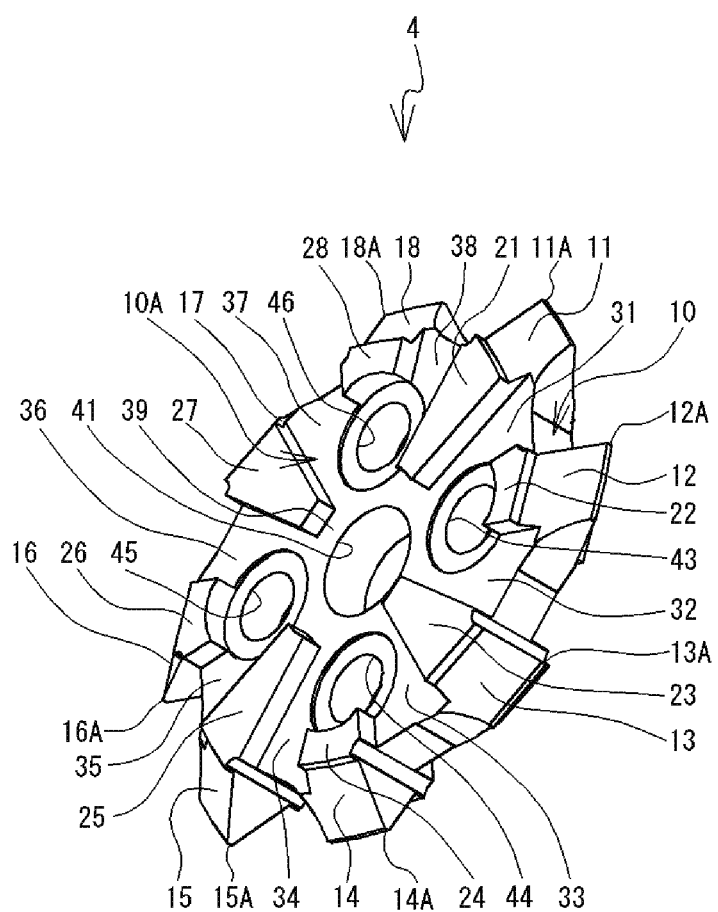
FIG. 2 is a perspective view of an insert 4.
Figure 3:
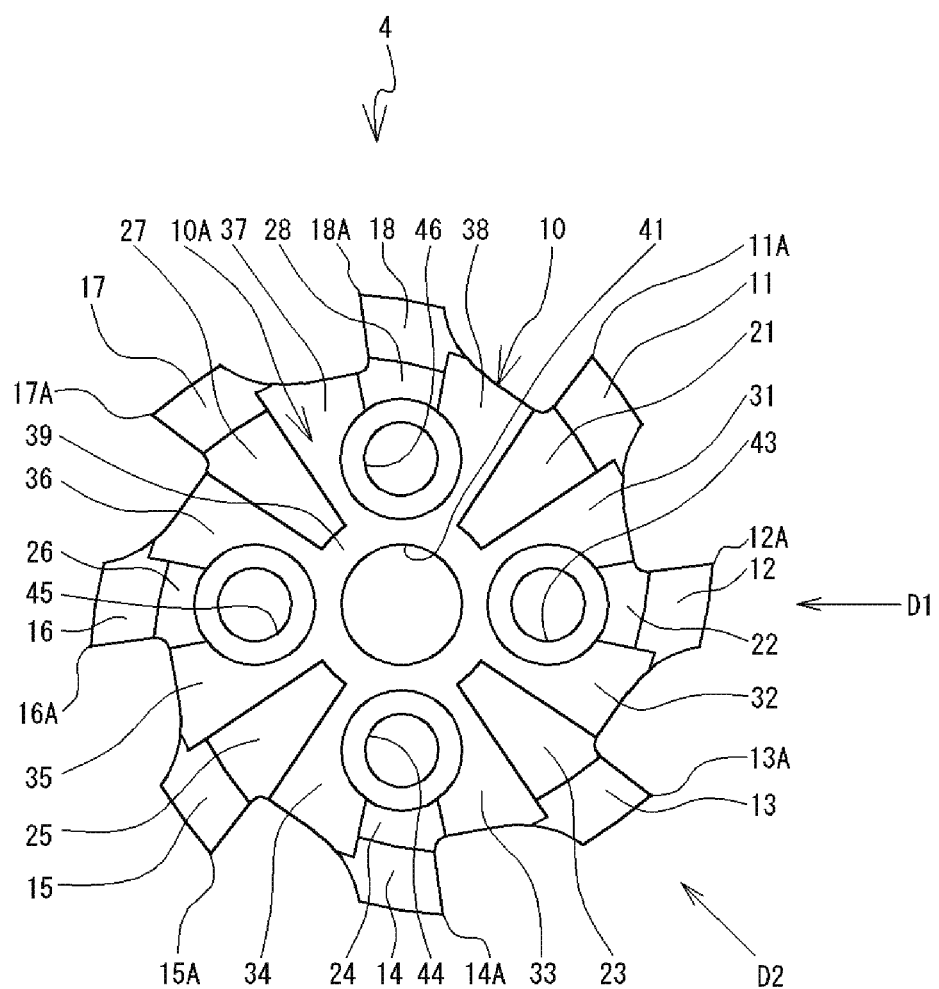
FIG. 3 is a plan view of the insert 4.
Figure 4:
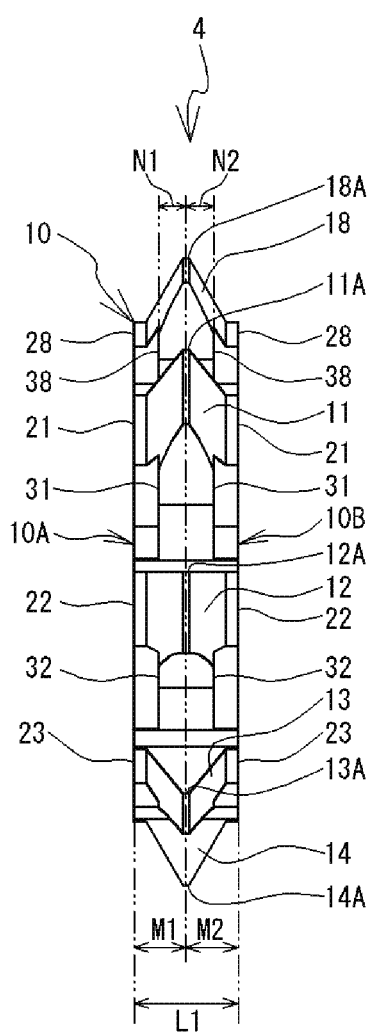
FIG. 4 is a side view of the insert 4.

A structure of the insert 4 will be specifically explained with reference to FIG. 2 to FIG. 4. FIG. 4 is a side view when the insert 4 shown in FIG. 3 is viewed from the direction of an arrow D1. As shown in FIG. 2 and FIG. 3, the insert 4 includes an insert main body 10 and eight blade portions 11 to 18. The insert 4 is used for finish machining and thus has a diameter smaller than that of the insert 5 for rough machining, which will be described below. The insert main body 10 is formed in a substantial disc shape having a specified thickness, and includes one face 10A and another face 10B (refer to FIG. 4). The insert main body 10 includes a shaft hole 41 and four insertion holes 43 to 46. The shaft hole 41 is provided in a center portion of the insert main body 10, and penetrates the one face 10A and the other face 10B. A boss 111 (to be described below, refer to FIG. 12), which is provided on the leading end portion of the body 2A, is inserted in the shaft hole 41. The four insertion holes 43 to 46 are respectively arranged in directions to form a cross around the shaft hole 41, and are provided in positions corresponding to each of the blade portions 12, 14, 16 and 18, as will be described below. The four screws 8 (refer to FIG. 1) are inserted in the insertion holes 43 to 46.

The blade portions 11 to 18 are provided on an outer peripheral edge portion of the insert main body 10, at mutually equal intervals in the circumferential direction. For ease of explanation, it is assumed that the blade portions 11 to 18 are arranged in order in the clockwise direction when the insert main body 10 is viewed from the one face 10A. When seen from the circumferential direction, the blade portions 11 to 18 are formed in a substantially triangular shape protruding outward in the radial direction. Blade tips 11A to 18A of the blade portions 11 to 18 are respectively arranged on the left side in the circumferential direction as viewed from the one face 10A (on the right side in the circumferential direction when viewed from the other face 10B).

Next, a surface shape of the insert main body 10 will be explained. Eight substantially fan-shaped convex portions 21 to 28, eight substantially fan-shaped concave portions 31 to 38, and a ring-shaped concave portion 39 are provided in each of the one face 10A and the other face 10B. In each of the one face 10A and the other face 10B, the convex portions 21 to 28 are provided in positions corresponding, respectively, to the blade portions 11 to 18. The convex portion 21 protrudes in the thickness direction of the insert main body 10 between the blade portion 11 and the shaft hole 41, and is formed so as to taper off toward the shaft hole 41 from the base portion of the blade portion 11. The convex portion 22 protrudes in the thickness direction of the insert main body 10 between the blade portion 12 and the insertion hole 43, and is formed so as to taper off toward the insertion hole 43 from the base portion of the blade portion 12.

Similarly to the convex portion 21, the convex portions 23, 25, and 27 protrude in the thickness direction of the insert main body 10 between the blade portions 13, 15, and 17 and the shaft hole 41, and are formed so as to taper off toward the shaft hole 41 from the base portions of the blade portions 13, 15, and 17. Further, similarly to the convex portion 22, the convex portions 24, 26, and 28 protrude in the thickness direction of the insert main body 10 between the insertion holes 44, 45, and 46 and the blade portions 14, 16, and 18, and are formed so as to taper off toward the insertion holes 44, 45, and 46 from the base portions of the blade portions 14, 16, and 18.

In the one face 10A and the other face 10B, the concave portions 31 to 38 are provided in sections excluding the convex portions 21 to 28, between each of the convex portions 21 to 28, and are formed to be lower than the convex portions 21 to 28 in the thickness direction of the insert main body 10. The concave portion 31 is provided between the convex portions 21 and 22, and is formed so as to taper off toward the shaft hole 41 from the outer peripheral edge portion of the insert main body 10. Similarly to the concave portion 31, the concave portion 32 is provided between the convex portions 22 and 23, the concave portion 33 is provided between the convex portions 23 and 24, the concave portion 34 is provided between the convex portions 24 and 25, the concave portion 35 is provided between the convex portions 25 and 26, the concave portion 36 is provided between the convex portions 26 and 27, the concave portion 37 is provided between the convex portions 27 and 28, and the concave portion 38 is provided between the convex portions 28 and 21, and each of the concave portions 32 to 38 is formed so as to taper off toward the shaft hole 41 from the outer peripheral edge portion of the insert main body 10. The ring-shaped concave portion 39 is formed in a ring shape along an outer peripheral edge portion of the shaft hole 41, is formed to be lower than the convex portions 21 to 28, and is connected to the concave portions 31 to 38 at their respective end portions on the shaft hole 41 side. The ring-shaped concave portion 39 and the concave portions 31 to 38 are flush with each other. As shown in FIG. 4, the convex portions 21 to 28 and the concave portions 31 to 38 provided in the one face 10A, and the convex portions 21 to 28 and the concave portions 31 to 38 provided in the other face 10B, are respectively arranged in the same positions as each other in the thickness direction of the insert main body 10.

As shown in FIG. 4, in the insert 4 provided with the above-described structure, a length from the center of the insert main body 10 in the thickness direction to each of leading end portions of the convex portions 21 to 28 on the one face 10A side is M1, a length from the center of the insert main body 10 in the thickness direction to each of leading end portions of the convex portions 21 to 28 on the other face 10B side is M2, a length from the center of the insert main body 10 in the thickness direction to each of bottom portions of the concave portions 31 to 38 on the one face 10A side is N1, and a length from the center of the insert main body 10 in the thickness direction to each of bottom portions of the concave portions 31 to 38 on the other face 10B side is N2. A thickness L1 of the insert 4 is a length from the convex portions 21 to 28 on the one face 10A side to the convex portions 21 to 28 on the other face 10B side, and thus is a length obtained by adding M1 and M2. At that time, any of the following cases can apply to the insert 4: M1=M2, M1>M2, M1<M2, N1=N2, N1>N2, and N1<N2.

Figure 5:
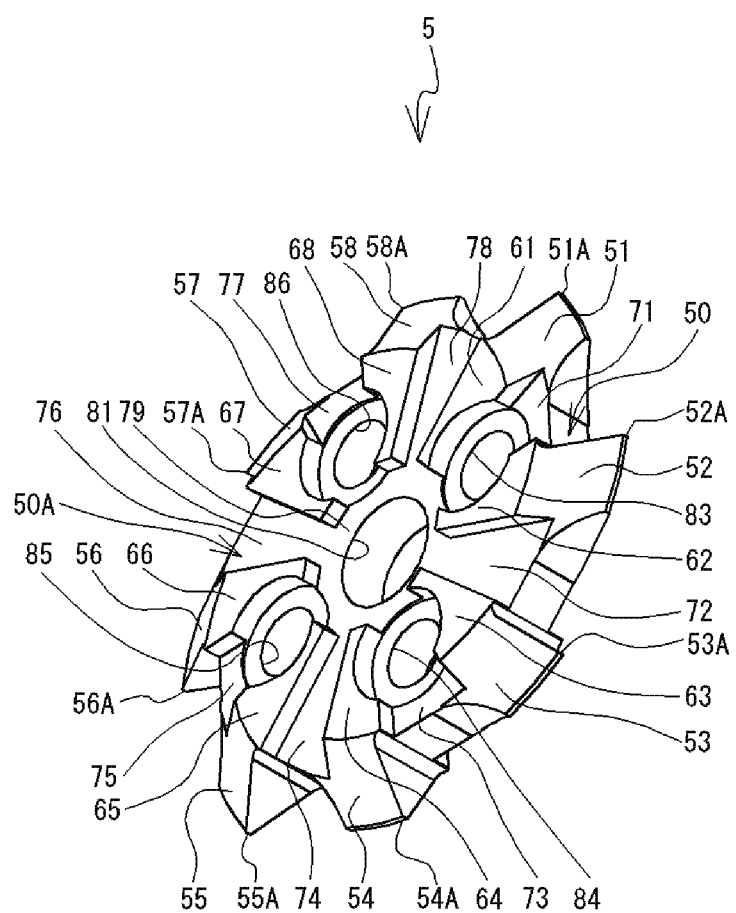
FIG. 5 is a perspective view of an insert 5.
Figure 6:
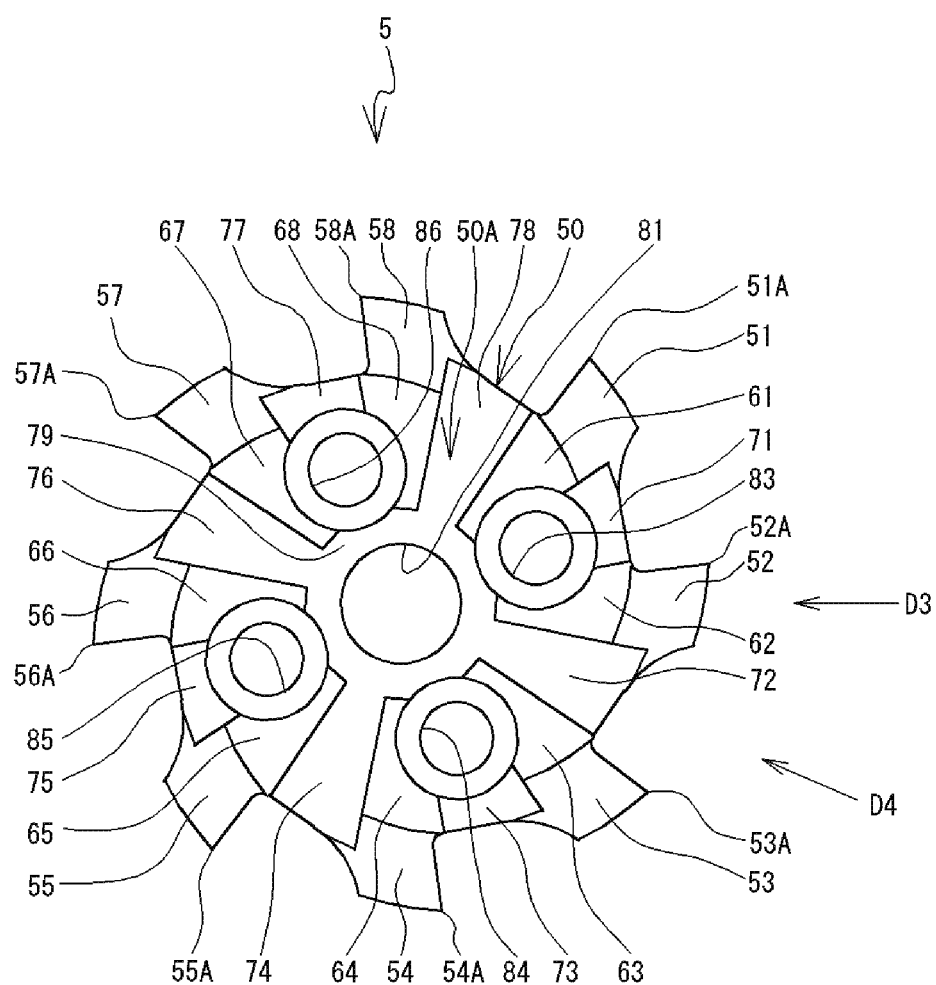
FIG. 6 is a plan view of the insert 5.
Figure 7:
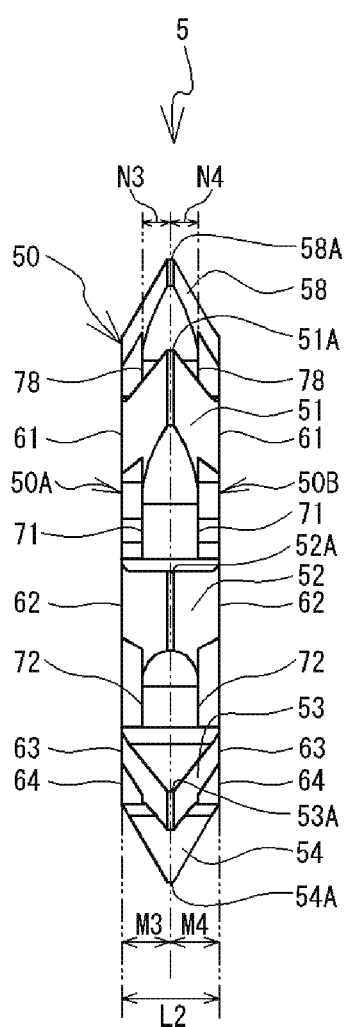
FIG. 7 is a side view of the insert 5.

A structure of the insert 5 will be specifically explained with reference to FIG. 5 to FIG. 7. FIG. 7 is a side view when the insert 5 shown in FIG. 6 is viewed from the direction of an arrow D3. As shown in FIG. 5 and FIG. 6, the insert 5 includes an insert main body 50 and eight blade portions 51 to 58. The insert main body 50 is formed in a substantial disc shape having a specified thickness, and includes one face 50A and another face 50B (refer to FIG. 7). The insert main body 50 includes a shaft hole 81 and four insertion holes 83 to 86. The shaft hole 81 is provided in a center portion of the insert main body 50, and penetrates the one face 50A and the other face 50B. The boss 111 (to be described below, refer to FIG. 12), which is provided on the leading end portion of the body 2A, is inserted in the shaft hole 81. The four insertion holes 83 to 86 are respectively arranged in directions to form a cross around the shaft hole 81, and are provided in positions respectively corresponding to a position between the blade portions 51 and 52, a position between the blade portions 53 and 54, a position between the blade portions 55 and 56, and a position between the blade portions 57 and 58. The four screws 8 (refer to FIG. 1) are inserted in the insertion holes 83 to 86.

The blade portions 51 to 58 are provided on an outer peripheral edge portion of the insert main body 50, at mutually equal intervals in the circumferential direction. For ease of explanation, it is assumed that the blade portions 51 to 58 are arranged in order in the clockwise direction when the insert main body 50 is viewed from the one face 50A. When seen from the circumferential direction, the blade portions 51 to 58 are formed in a substantially triangular shape protruding outward in the radial direction. Blade tips 51A to 58A of the blade portions 51 to 58 are respectively arranged on the left side in the circumferential direction as viewed from the one face 50A (on the right side in the circumferential direction when viewed from the other face 50B).

Next, a surface shape of the insert main body 50 will be explained. Eight substantially fan-shaped convex portions 61 to 68, eight substantially fan-shaped concave portions 71 to 78, and a ring-shaped concave portion 79 are respectively provided in the one face 50A and the other face 50B. In each of the one face 50A and the other face 50B, the convex portions 61 to 68 are provided in positions corresponding, respectively, to the blade portions 51 to 58. The convex portion 61 protrudes in the thickness direction of the insert main body 50 between the blade portion 51 and the shaft hole 81, and is formed so as to taper off toward the shaft hole 81 from the base portion of the blade portion 51. A section of the convex portion 61 that overlaps with the insertion hole 83 is curved along a curved outer edge portion of the insertion hole 83. The convex portion 62 protrudes in the thickness direction of the insert main body 50 between the blade portion 52 and the shaft hole 81, and is formed so as to taper off toward the shaft hole 81 from the base portion of the blade portion 52. A section of the convex portion 62 that overlaps with the insertion hole 83 is curved along a curved outer edge portion of the insertion hole 83.

Similarly to the convex portions 61 and 62, the convex portions 63 and 64 protrude in the thickness direction of the insert main body 50 between the blade portions 53 and 54 and the shaft hole 81, and are formed so as to taper off toward the shaft hole 81 from the base portions of the blade portions 53 and 54. Sections of the convex portions 63 and 64 that overlap with the insertion hole 84 are curved along curved outer edge portions of the insertion hole 84. The convex portions 65 and 66 protrude in the thickness direction of the insert main body 50 between the blade portions 55 and 56 and the shaft hole 81, and are formed so as to taper off toward the shaft hole 81 from the base portions of the blade portions 55 and 56. Sections of the convex portions 65 and 66 that overlap with the insertion hole 85 are curved along curved outer edge portions of the insertion hole 85. The convex portions 67 and 68 protrude in the thickness direction of the insert main body 50 between the blade portions 57 and 58 and the shaft hole 81, and are formed so as to taper off toward the shaft hole 81 from the base portions of the blade portions 57 and 58. Sections of the convex portions 67 and 68 that overlap with the insertion hole 86 are curved along curved outer edge portions of the insertion hole 86.

In the one face 50A and the other face 50B, the concave portions 71 to 78 are provided in sections excluding the convex portions 61 to 68, between each of the convex portions 61 to 68, and are formed to be lower than the convex portions 61 to 68 in the thickness direction of the insert main body 50. The concave portion 71 is provided between the convex portions 61 and 62, the concave portion 72 is provided between the convex portions 62 and 63, the concave portion 73 is provided between the convex portions 63 and 64, the concave portion 74 is provided between the convex portions 64 and 65, the concave portion 75 is provided between the convex portions 65 and 66, the concave portion 76 is provided between the convex portions 66 and 67, the concave portion 77 is provided between the convex portions 67 and 68, and the concave portion 78 is provided between the convex portions 68 and 61. Each of the concave portions 71 to 78 is formed so as to taper off toward the shaft hole 81 from the outer peripheral edge portion of the insert main body 50.

The insertion holes 83 to 86 are provided on the shaft hole 81 side of the concave portions 71, 73, 75, and 77, respectively. The ring-shaped concave portion 79 is formed in a ring shape along an outer peripheral edge portion of the shaft hole 81, is formed to be lower than the convex portions 61 to 68, and is connected to the concave portions 71 to 78 at their respective end portions on the shaft hole 81 side. The ring-shaped concave portion 79 and the concave portions 71 to 78 are flush with each other. As shown in FIG. 7, the convex portions 61 to 68 and the concave portions 71 to 78 provided in the one face 50A, and the convex portions 61 to 68 and the concave portions 71 to 78 provided in the other face 50B, are respectively arranged in the same positions as each other in the thickness direction of the insert main body 50.

In the insert 5 provided with the above-described structure, a length from the center of the insert main body 50 in the thickness direction to each of leading end portions of the convex portions 61 to 68 on the one face 50A side is M3, a length to each of leading end portions of the convex portions 61 to 68 on the other face 50B side is M4, a length from the center of the insert main body 50 in the thickness direction to each of bottom portions of the concave portions 71 to 78 on the one face 50A side is N3, and a length from the center of the insert main body 50 in the thickness direction to each of bottom portions of the concave portions 71 to 78 on the other face 50B side is N4. A thickness L2 of the insert 5 is a length from the convex portions 61 to 68 on the one face 50A side to the convex portions 61 to 68 on the other face 50B side, and thus is a length obtained by adding M3 and M4. At that time, any of the following cases can apply to the insert 5: M3=M4, M3>M4, M3<M4, N3=N4, N3>N4, and N3<N4.

Figure 8:
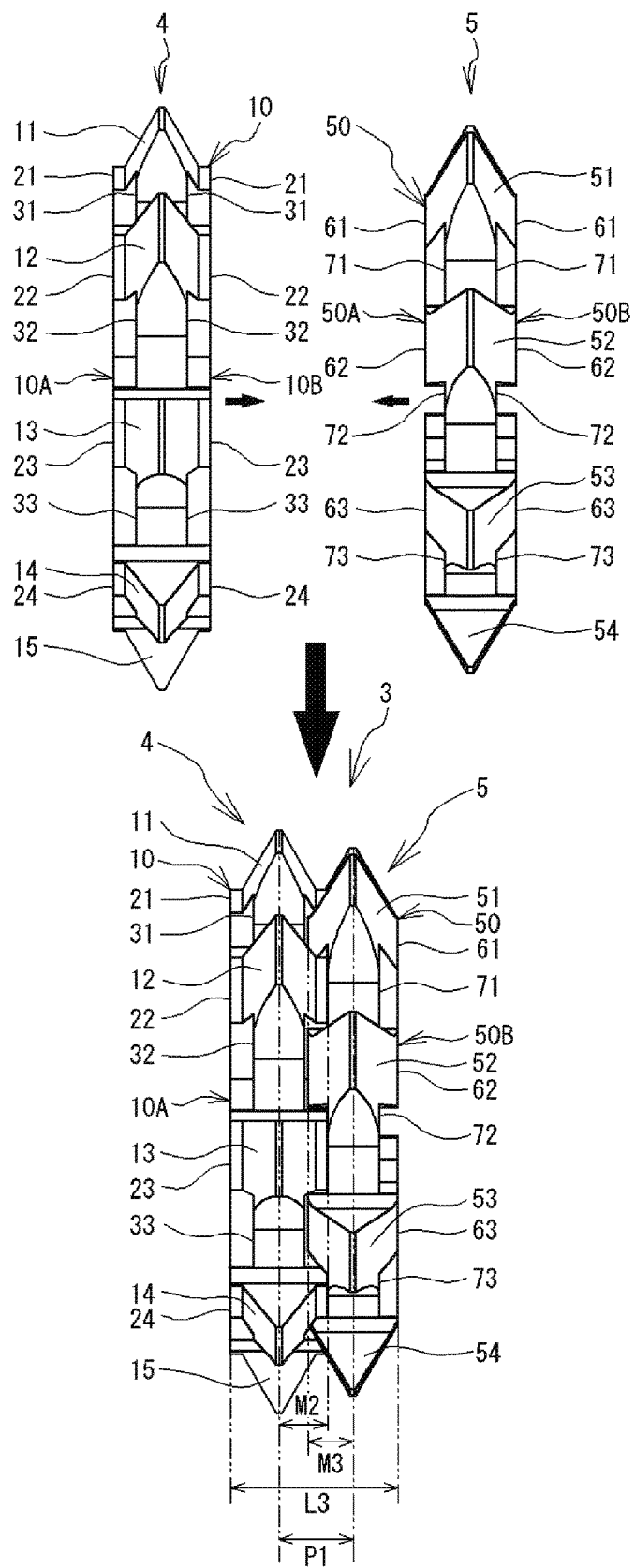
FIG. 8 is a diagram showing a method of creating an insert portion 3 by overlaying the inserts 4 and 5.
Figure 9:
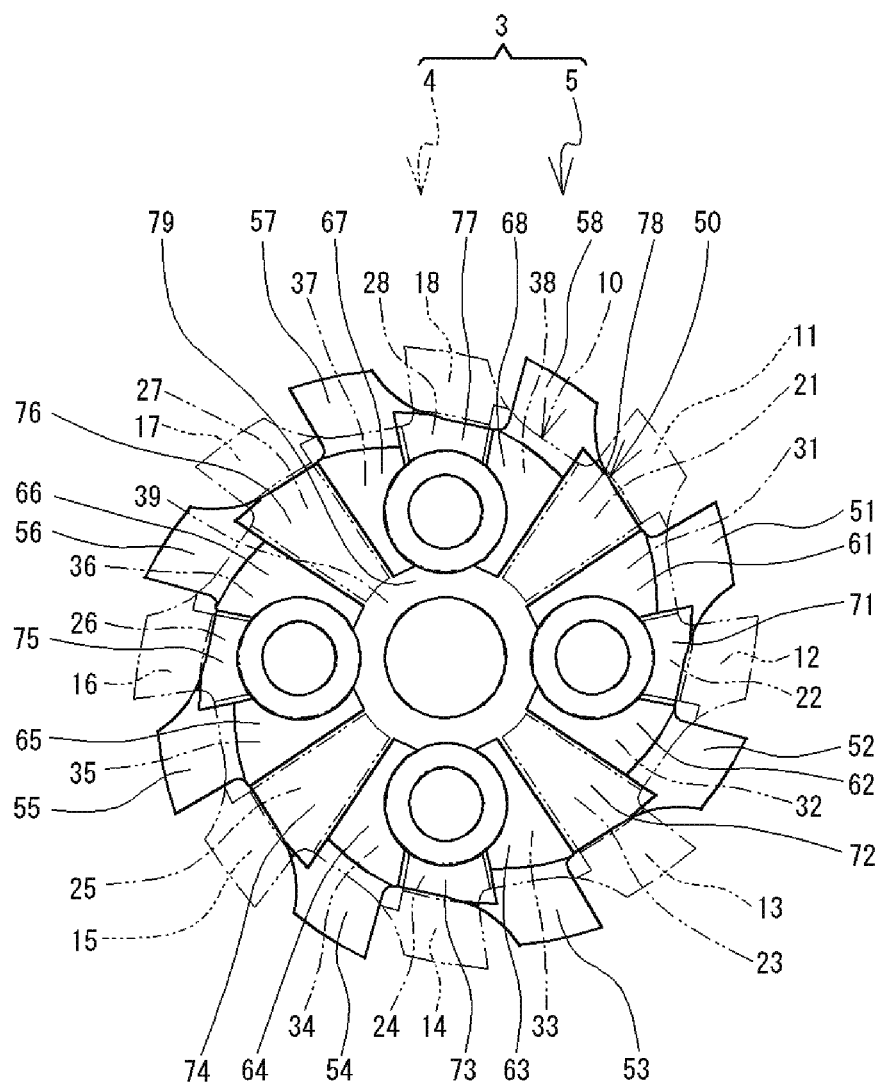
FIG. 9 is a diagram of the insert portion 3 as seen from the insert 4 side.

A method of creating the insert portion 3 by overlaying the inserts 4 and 5 will be explained with reference to FIG. 8 and FIG. 9. The insert 4 shown in FIG. 8 shows a side surface when the insert 4 shown in FIG. 3 is viewed from the direction of the arrow D2. The insert 5 shown in FIG. 8 shows a side surface when the insert 5 shown in FIG. 6 is viewed from the direction of an arrow D4. In FIG. 9, the insert 5 is shown using solid lines and the insert 4 is shown using two-dot chain lines.

As shown in FIG. 8, for example, the other face 10B of the insert 4 and the one face 50A of the insert 5 are caused to face each other, and are overlaid with one another. At this time, the other face 10B and the one face 50A are mating faces.

As shown in FIG. 8 and FIG. 9, the convex portion 21 provided on the other face 10B is inserted in the concave portion 78 provided in the one face 50A. The convex portion 22 provided on the other face 10B is inserted in the concave portion 71 provided in the one face 50A. The convex portion 23 provided on the other face 10B is inserted in the concave portion 72 provided in the one face 50A. The convex portion 24 provided on the other face 10B is inserted in the concave portion 73 provided in the one face 50A. The convex portion 25 provided on the other face 10B is inserted in the concave portion 74 provided in the one face 50A. The convex portion 26 provided on the other face 10B is inserted in the concave portion 75 provided in the one face 50A. The convex portion 27 provided on the other face 10B is inserted in the concave portion 76 provided in the one face 50A. The convex portion 28 provided on the other face 10B is inserted in the concave portion 77 provided in the one face 50A.

Meanwhile, the convex portion 61 provided on the one face 50A is inserted in the concave portion 31 provided in the other face 10B. The convex portion 62 provided on the one face 50A is inserted in the concave portion 32 provided in the other face 10B. The convex portion 63 provided on the one face 50A is inserted in the concave portion 33 provided in the other face 10B. The convex portion 64 provided on the one face 50A is inserted in the concave portion 34 provided in the other face 10B. The convex portion 65 provided on the one face 50A is inserted in the concave portion 35 provided in the other face 10B. The convex portion 66 provided on the one face 50A is inserted in the concave portion 36 provided in the other face 10B. The convex portion 67 provided on the one face 50A is inserted in the concave portion 37 provided in the other face 10B. The convex portion 68 provided on the one face 50A is inserted in the concave portion 38 provided in the other face 10B. In this way, the inserts 4 and 5 are coaxially overlaid with each other and thus configure the insert portion 3.

In the insert portion 3, the leading end portion of the convex portion 21 provided on the other face 10B is in contact with the bottom portion of the concave portion 78 provided in the one face 50A. The leading end portion of the convex portion 22 provided on the other face 10B is in contact with the bottom portion of the concave portion 71 provided in the one face 50A. The leading end portion of the convex portion 23 provided on the other face 10B is in contact with the bottom portion of the concave portion 72 provided in the one face 50A. The leading end portion of the convex portion 24 provided on the other face 10B is in contact with the bottom portion of the concave portion 73 provided in the one face 50A. The leading end portion of the convex portion 25 provided on the other face 10B is in contact with the bottom portion of the concave portion 74 provided in the one face 50A. The leading end portion of the convex portion 26 provided on the other face 10B is in contact with the bottom portion of the concave portion 75 provided in the one face 50A. The leading end portion of the convex portion 27 provided on the other face 10B is in contact with the bottom portion of the concave portion 76 provided in the one face 50A. The leading end portion of the convex portion 28 provided on the other face 10B is in contact with the bottom portion of the concave portion 77 provided in the one face 50A.

Meanwhile, the leading end portion of the convex portion 61 provided on the one face 50A faces the bottom portion of the concave portion 31 provided in the other face 10B, with a space therebetween. The leading end portion of the convex portion 62 provided on the one face 50A faces the bottom portion of the concave portion 32 provided in the other face 10B with a space therebetween, and the leading end portion of the convex portion 63 provided on the one face 50A faces the bottom portion of the concave portion 33 provided in the other face 10B with a space therebetween. The leading end portion of the convex portion 64 provided on the one face 50A faces the bottom portion of the concave portion 34 provided in the other face 10B with a space therebetween. The leading end portion of the convex portion 65 provided on the one face 50A faces the bottom portion of the concave portion 35 provided in the other face 10B with a space therebetween. The leading end portion of the convex portion 66 provided on the one face 50A faces the bottom portion of the concave portion 36 provided in the other face 10B with a space therebetween. The leading end portion of the convex portion 67 provided on the one face 50A faces the bottom portion of the concave portion 37 provided in the other face 10B with a space therebetween. The leading end portion of the convex portion 68 provided on the one face 50A faces the bottom portion of the concave portion 38 provided in the other face 10B with a space therebetween.

As shown in FIG. 8, a thickness L3 of the insert portion 3 corresponds to a distance between each of the leading end portions of the convex portions 21 to 28 provided on the one face 10A of the insert 4 and each of the leading end portions of the convex portions 61 to 68 provided on the other face 50B of the insert 5. Then, by the convex portions and the concave portions of the other face 10B and the one face 50A being respectively overlaid with each other as described above, the thickness M2 on the other face 10B side of the insert 4 and the thickness M3 on the one face 50A side of the insert 5 can be mutually overlapped in the thickness direction of the insert portion 3. In other words, the thread mill 1A can make the thickness L3 of the insert portion 3 shorter than the distance obtained by adding the thickness L1 (refer to FIG. 4) of the insert 4 and the thickness L2 (refer to FIG. 7) of the insert 5. For example, when the thickness of the insert 4 is 5 mm and the thickness of the insert 5 is 4 mm, in contrast to the total 9 mm of the individual thicknesses of the inserts 4 and 5, the total thickness when the inserts 4 and 5 are overlaid with each other is 8 mm. In this case, a length of the mutual overlap in the thickness direction of the inserts 4 and 5 is 1 mm. In this way, the thread mill 1A can reduce a length of protrusion of the insert portion 3 in the axial direction and can thus improve the rigidity of the insert portion 3. Further, since the rigidity of the insert portion 3 can be improved, it is possible to suppress run-out that occurs when the thread mill 1A rotates.

In addition, as described above, the leading end portions of the convex portions 21 to 28 of the other face 10B of the insert 4 are respectively in contact with the bottom portions of the concave portions 71 to 78 of the one face 50A of the insert 5, but the leading end portions of the convex portions 61 to 68 on the insert 5 side is not in contact with the bottom portions of the concave portions 31 to 38 of the insert 4. This is because the height of the convex portions 61 to 68 of the insert 5 is less than the depth of the concave portions 31 to 38 of the insert 4. The height of the convex portions is a difference of elevation from the concave portions, and is the length from the bottom portions of the concave portions to the leading end portions of the convex portions. The depth of the concave portions is a difference of elevation from the convex portions, and is the length from the leading end portions of the convex portions to the bottom portions of the concave portions. In this way, in the insert portion 3, the inserts 4 and 5 can be overlaid with each other such that the inserts 4 and 5 are mutually parallel without any bias, and thus, a pitch P1 can be made even. The pitch P1 is a distance between the blade portions 11 to 18 of the insert 4 and the blade portions 51 to 58 of the insert 5. The pitch P1 corresponds to a pitch of the thread cut into the hole 6 (refer to FIG. 22) of the workpiece 7.

Figure 10:
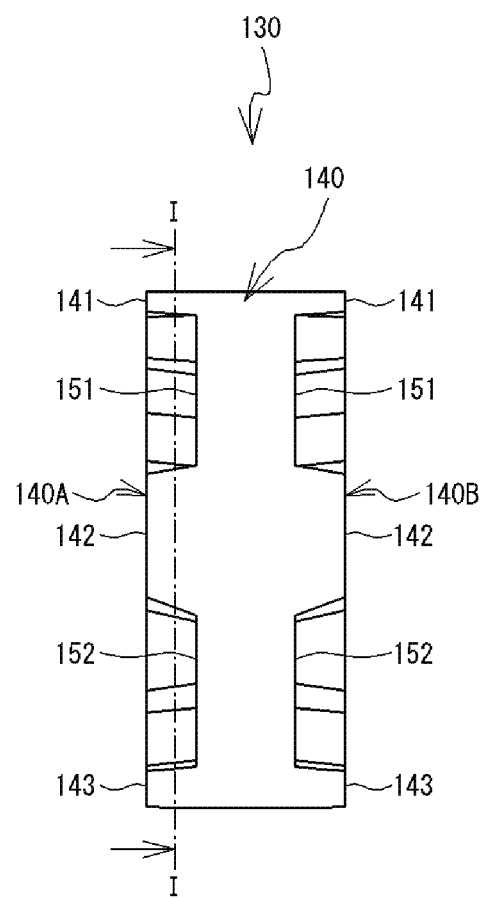
FIG. 10 is a side view of an insert 130.

Arrangement conditions of the convex portions and the concave portions of the inserts will be explained with reference to FIG. 10 and FIG. 11. The convex portions and the concave portions provided in each of the mating faces of the inserts 4 and 5 shown in FIG. 8 can be overlaid with each other even when the orientation of one or both of the inserts 4 and 5 are reversed. In order to achieve this, it is necessary to arrange the convex portions and the concave portions provided in both faces of the inserts in accordance with the arrangement conditions described below. Here, an insert 130 shown in FIG. 10 and FIG. 11 will be given as an example in explaining the arrangement conditions of the convex portions and the concave portions. FIG. 10 is a side view when the insert 130 shown in FIG. 11 is viewed from the direction of an arrow D5.

The insert 130 includes a disc-shaped insert main body 140. In FIG. 10 and FIG. 11, blade portions, a shaft hole, and insertion holes provided in the insert 130 are not illustrated. The insert main body 140 includes one face 140A and another face 140B. Surface shapes of the one face 140A and the other face 140B are the same.

Figure 11:
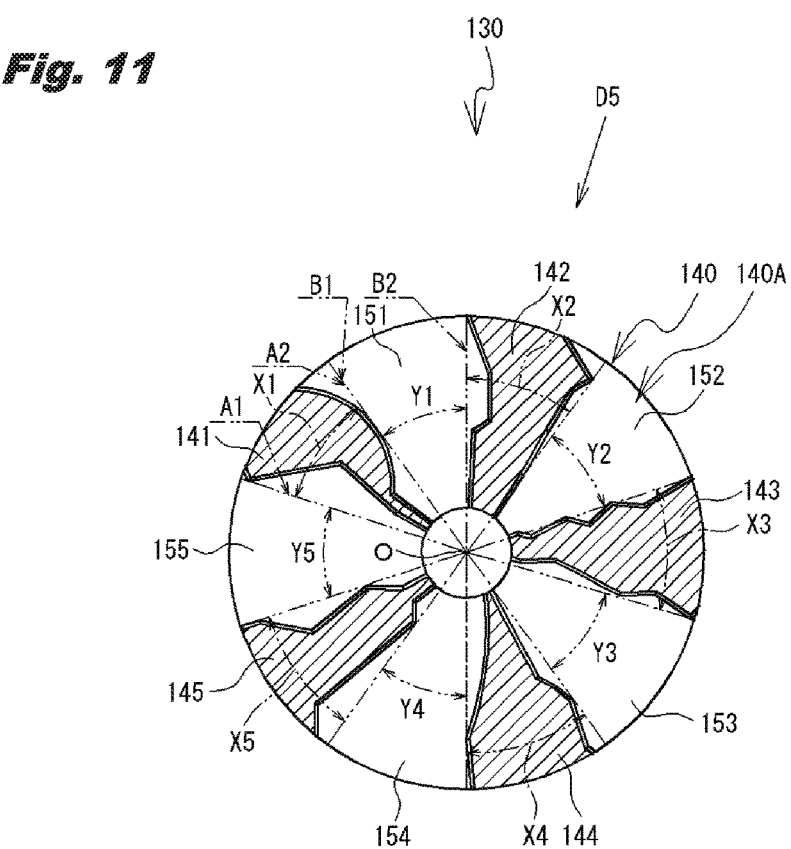
FIG. 11 is a plan view of the insert 130.

As shown in FIG. 11, five convex portions 141 to 145 and five concave portions 151 to 155 are arranged alternately in the clockwise direction around a center O in the one face 140A. Next, virtual straight lines A1 and A2 are drawn from the center O such that the virtual straight lines A1 and A2 respectively contact outermost peripheral edge portions of the convex portion 141 on both sides of the convex portion 141 in the circumferential direction, and a minimum angle when the whole of the convex portion 141 is included between these virtual straight lines A1 and A2 is X1. Then, similarly to the convex portion 141, a minimum angle of two virtual straight lines that respectively contact outermost peripheral edge portions of the convex portion 142 is X2, a minimum angle of two virtual straight lines that respectively contact outermost peripheral edge portions of the convex portion 143 is X3, a minimum angle of two virtual straight lines that respectively contact outermost peripheral edge portions of the convex portion 144 is X4, and a minimum angle of two virtual straight lines that respectively contact outermost peripheral edge portions of the convex portion 145 is X5. The shape of each of the convex portions 141 to 145 may be any shape as long as each of the convex portions 141 to 145 is between the two virtual straight lines.

Further, virtual straight lines B1 and B2 are drawn from the center O such that the virtual straight lines B1 and B2 respectively contact outermost peripheral edge portions of the concave portion 151 on both sides of the concave portion 151 in the circumferential direction, and a maximum angle when no convex portion is included between the virtual straight lines B1 and B2 is Y1. Similarly to the concave portion 151, a maximum angle when no convex portion is included between two virtual straight lines that respectively contact outermost peripheral edge portions of the concave portion 152 is Y2, a maximum angle when no convex portion is included between two virtual straight lines that respectively contact outermost peripheral edge portions of the concave portion 153 is Y3, a maximum angle when no convex portion is included between two virtual straight lines that respectively contact outermost peripheral edge portions of the concave portion 154 is Y4, and a maximum angle when no convex portion is included between two virtual straight lines that respectively contact outermost peripheral edge portions of the concave portion 155 is Y5.

When the insert portion 3 is configured by mutually overlaying two of the inserts 130, on both faces of which the convex portions and the concave portions are provided as described above, in order to allow one of the inserts 130 to be overlaid with the other insert 130 even when the one of the inserts 130 is reversed, it is necessary to satisfy the following five conditions:

(1) Each one of X1 to X5 is smaller than Y1 to Y5.

(2) A sum of X1 to X5 of the convex portions 141 to 145 is less than 180°.

(3) A sum of Y1 to Y5 of the concave portions 151 to 155 is greater than 180°.

(4) Of X1 to X5, a maximum angle $X_{max}$ is less than 180/5°.

(5) Of Y1 to Y5, a maximum angle $Y_{max}$ is greater than 180/5°.

Further, X1+Y1, X2+Y2, X3+Y3, X4+Y4, and X5+Y5 are equally divided when each of them is the same as 360/5°. In this case, the convex portions 141 to 145 and the concave portions 151 to 155 provided on the mating face of one of the inserts 130 can be overlaid with the concave portions 151 to 155 and the convex portions 141 to 145 provided on the mating face of the other insert 130 without any interference in any position. The inserts 4 and 5 of the present embodiment satisfy all of the above-described arrangement conditions. Thus, in the insert portion 3, even if one or both of the inserts 4 and 5 is reversed, the inserts 4 and 5 can be overlaid with each other, and the convex portions and the concave portions respectively provided on both the faces can be overlaid without any interference in any position.

Figure 12:
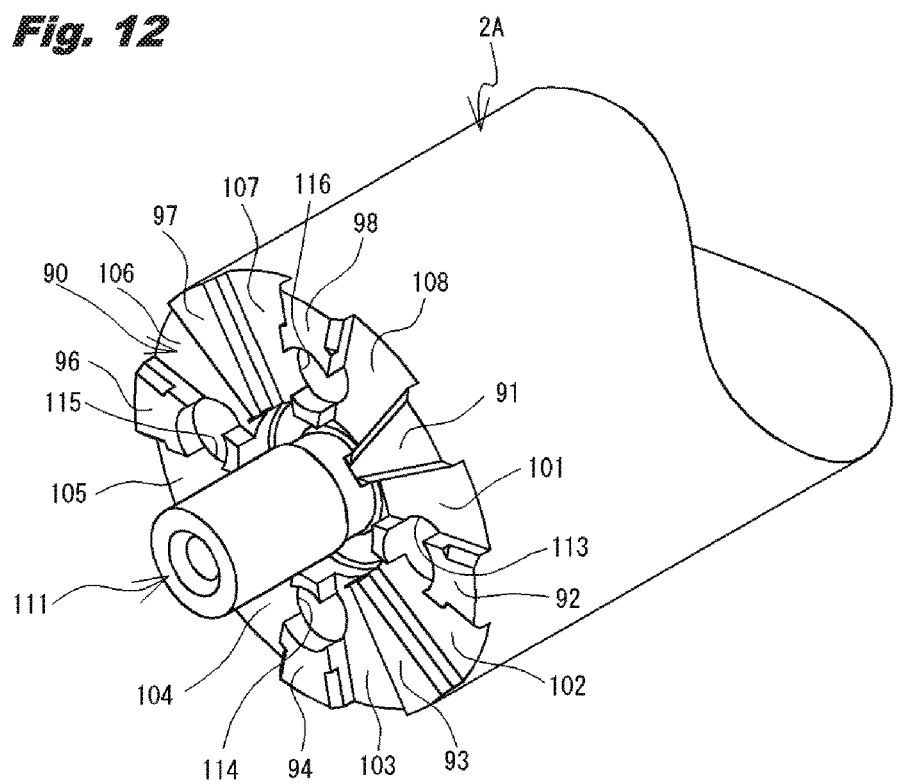
FIG. 12 is a partially enlarged perspective view of a leading end side of a body 2A.
Figure 13:
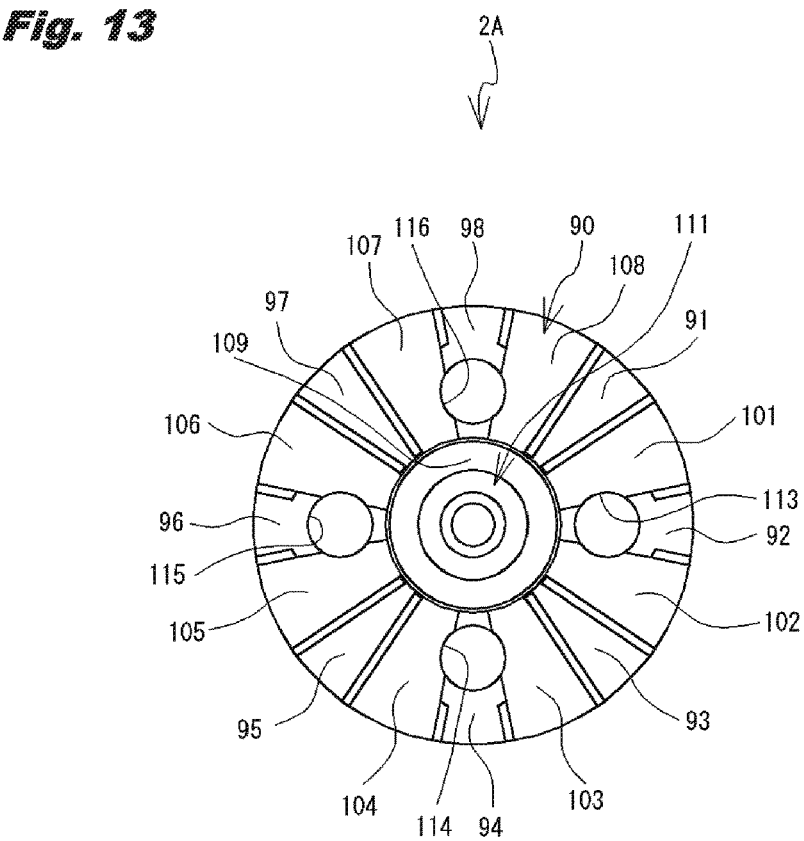
FIG. 13 is an end view of the leading end side of the body 2A.

A shape of an attachment face 90 of the body 2A will be explained with reference to FIG. 12 and FIG. 13. The circular attachment face 90 is provided on the leading end portion of the body 2A. The insert 5 (refer to FIG. 5 and FIG. 6) can be detachably attached to the attachment face 90. The boss 111 and four screw holes 113 to 116 are provided in the attachment face 90. The boss 111 is provided in the center portion of the attachment face 90, and is formed in a substantially cylindrical shape extending along the axial line of the body 2A. The four screw holes 113 to 116 are respectively arranged in directions to form a cross around the boss 111 and are arranged in order in the clockwise direction. The four screws 8 (refer to FIG. 1) can be tightened in these screw holes 113 to 116.

The attachment face 90 is provided with a concave and convex shape corresponding to the concave and convex shape of both faces of the insert 5. Eight substantially fan-shaped convex portions 91 to 98, eight substantially fan-shaped concave portions 101 to 108, and a ring-shaped concave portion 109 are respectively provided on the attachment face 90. The convex portion 91 is provided centrally between the screw holes 113 and 116 so as to protrude in parallel to the axial direction of the body 2A, and is formed to taper from the outer peripheral edge portion of the attachment face 90 toward the boss 111. The convex portion 92 is provided between the screw hole 113 and the outer peripheral edge portion so as to protrude in parallel to the axial direction of the body 2A, and is formed to taper from the outer peripheral edge portion toward the screw hole 113.

Further, similarly to the convex portion 91, the convex portion 93 is provided centrally between the screw holes 113 and 114, the convex portion 95 is provided centrally between the screw holes 114 and 115, and the convex portion 97 is provided centrally between the screw holes 115 and 116 such that each of the convex portions 93, 95, and 97 protrudes in parallel to the axial direction of the body 2A and each is formed to taper from the outer peripheral edge portion of the attachment face 90 toward the boss 111. In addition, similarly to the convex portion 92, the convex portion 94 is provided between the screw hole 114 and the outer peripheral edge portion, the convex portion 96 is provided between the screw hole 115 and the outer peripheral edge portion, and the convex portion 98 is provided between the screw hole 116 and the outer peripheral edge portion, such that each of the convex portions 94, 96, and 98 protrudes in parallel to the axial direction of the body 2A and each is formed to taper from the outer peripheral edge portion of the attachment face 90 toward the screw holes 114, 115, and 116.

Meanwhile, the concave portions 101 to 108 are provided between each of the convex portions 91 to 98, and, in the axial direction of the body 2A, the concave portions 101 to 108 are formed to be lower than the convex portions 91 to 98 on the rear end side in the axial direction. The concave portion 101 is provided between the convex portions 91 and 92, and is formed to taper toward the boss 111 from the outer peripheral edge portion of the attachment face 90. Then, similarly to the concave portion 101, the concave portion 102 is provided between the convex portions 92 and 93, the concave portion 103 is provided between the convex portions 93 and 94, the concave portion 104 is provided between the convex portions 94 and 95, the concave portion 105 is provided between the convex portions 95 and 96, the concave portion 106 is provided between the convex portions 96 and 97, the concave portion 107 is provided between the convex portions 97 and 98, and the concave portion 108 is provided between the convex portions 98 and 91, and each of the concave portions 102 to 108 is formed to taper toward the boss 111 from the outer peripheral edge portion of the attachment face 90.

The ring-shaped concave portion 109 is provided in a ring shape along the outer periphery of the boss 111, and is connected to end portions of the concave portions 101 to 108 on the boss 111 side. The ring-shaped concave portion 109 is formed to be lower than the concave portions 101 to 108 in the axial direction of the body 2A. The convex portions 91 to 98 and the concave portions 101 to 108 of the attachment face 90 also satisfy the above-described arrangement conditions of the convex portions and the concave portions.

Figure 18:
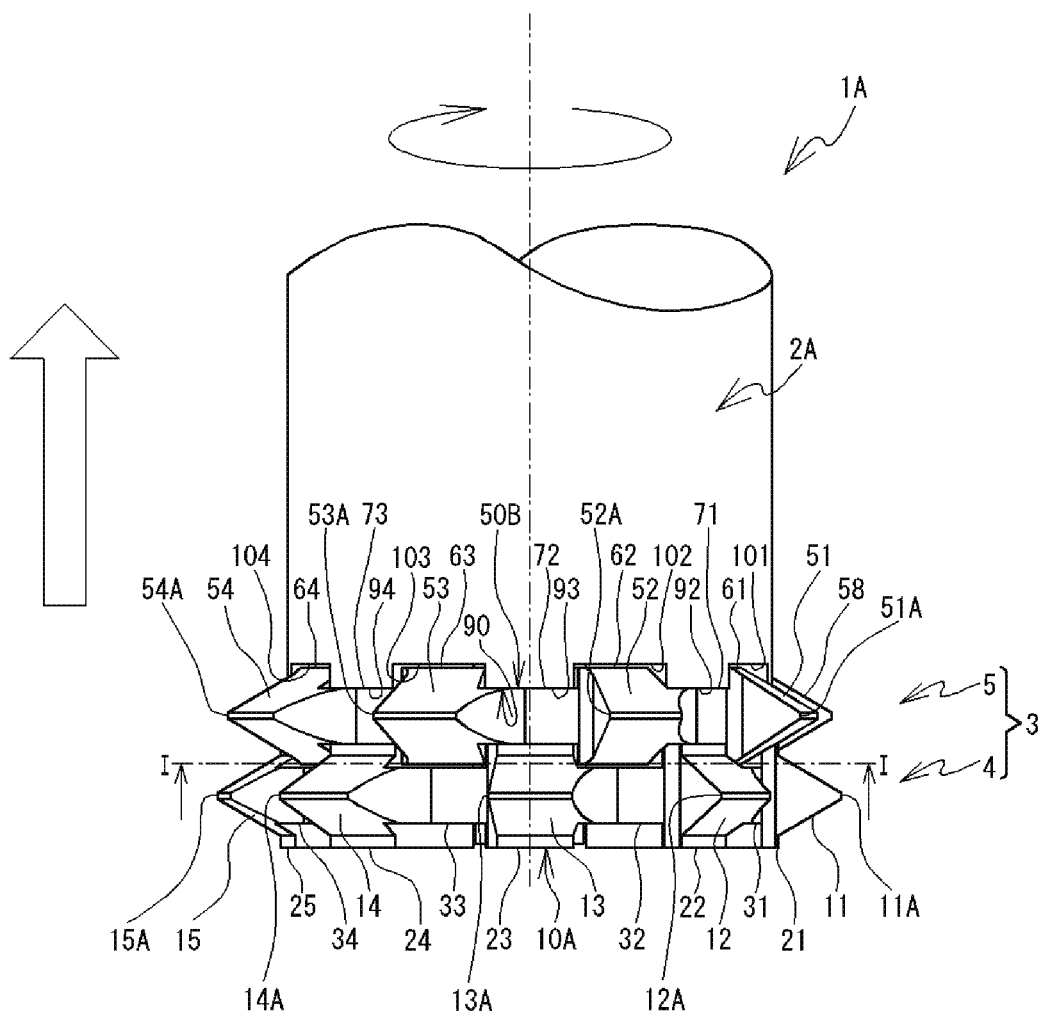
FIG. 18 is a side view of a leading end side of the thread mill 1A for right-hand cut down-cut milling.

A method for attaching the insert portion 3 to the body 2A will be explained with reference to FIG. 13, FIG. 14, FIG. 16, and FIG. 18. Here, the method for attaching the insert portion 3 to the body 2A will be explained with the object of forming the thread mill 1A shown in FIG. 18. As described above, the insert 5 can be attached to the body 2A. Thus, of the insert portion 3, the other face 50B side of the insert 5 is caused to face the attachment face 90 of the body 2A. Next, the boss 111 of the attachment face 90 is inserted in the shaft hole 81 of the insert 5 and the shaft hole 41 of the insert 4, in that order. Then, the other face 50B of the insert 5 is overlaid with the attachment face 90, as shown in FIG. 18. At this time, the other face 50B and the attachment face 90 are mating faces.

Figure 16:
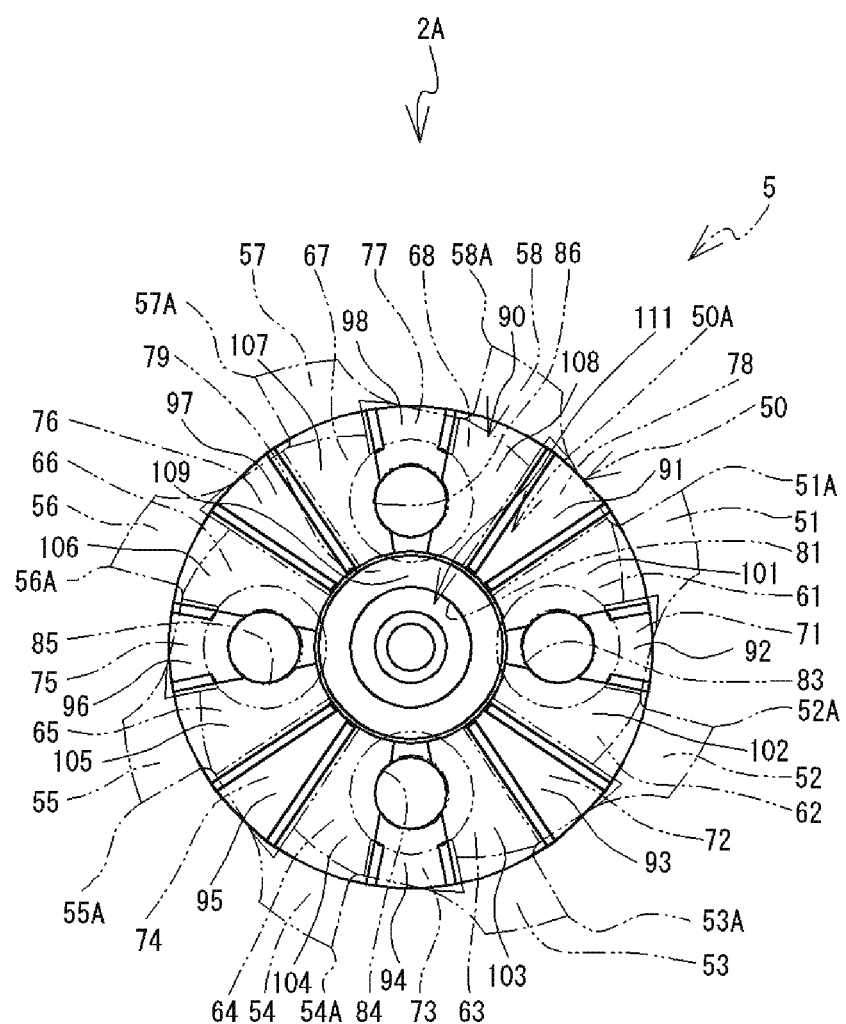
FIG. 16 is a diagram showing a state in which the insert 5 is overlaid on an attachment face 90 of the body 2A.

In FIG. 16, the attachment face 90 of the body 2A is shown using solid lines and the insert 5 is shown using two-dot chain lines. As shown in FIG. 16, the convex portion 61 provided on the other face 50B of the insert 5 is inserted in the concave portion 101 provided in the attachment face 90. The convex portion 62 provided on the other face 50B is inserted in the concave portion 102 provided in the attachment face 90. The convex portion 63 provided on the other face 50B is inserted in the concave portion 103 provided in the attachment face 90. The convex portion 64 provided on the other face 50B is inserted in the concave portion 104 provided in the attachment face 90. The convex portion 65 provided on the other face 50B is inserted in the concave portion 105 provided in the attachment face 90. The convex portion 66 provided on the other face 50B is inserted in the concave portion 106 provided in the attachment face 90. The convex portion 67 provided on the other face 50B is inserted in the concave portion 107 provided in the attachment face 90. The convex portion 68 provided on the other face 50B is inserted in the concave portion 108 provided in the attachment face 90.

Meanwhile, the convex portion 91 provided on the attachment face 90 is inserted in the concave portion 78 provided in the other face 50B. The convex portion 92 provided on the attachment face 90 is inserted in the concave portion 71 provided in the other face 50B. The convex portion 93 provided on the attachment face 90 is inserted in the concave portion 72 provided in the other face 50B. The convex portion 94 provided on the attachment face 90 is inserted in the concave portion 73 provided in the other face 50B. The convex portion 95 provided on the attachment face 90 is inserted in the concave portion 74 provided in the other face 50B. The convex portion 96 provided on the attachment face 90 is inserted in the concave portion 75 provided in the other face 50B. The convex portion 97 provided on the attachment face 90 is inserted in the concave portion 76 provided in the other face 50B. The convex portion 98 provided on the attachment face 90 is inserted in the concave portion 77 provided in the other face 50B.

Next, the four screws 8 are respectively inserted in the insertion holes 43 to 46 of the insert 4 and the insertion holes 83 to 86 of the insert 5, and are respectively tightened in the screw holes 113 to 116 of the attachment face 90. In this way, the insert portion 3 is fixed with respect to the attachment face 90 of the body 2A, and the thread mill 1A is configured.

Here, as shown in FIG. 16 and FIG. 18, in a state in which the other face 50B of the insert 5 is attached to the attachment face 90 of the body 2A, the leading end portion of the convex portion 91 provided on the attachment face 90 is in contact with the bottom portion of the concave portion 78 provided in the other face 50B. The leading end portion of the convex portion 92 provided on the attachment face 90 is in contact with the bottom portion of the concave portion 71 provided in the other face 50B. The leading end portion of the convex portion 93 provided on the attachment face 90 is in contact with the bottom portion of the concave portion 72 provided in the other face 50B. The leading end portion of the convex portion 94 provided on the attachment face 90 is in contact with the bottom portion of the concave portion 73 provided in the other face 50B. The leading end portion of the convex portion 95 provided on the attachment face 90 is in contact with the bottom portion of the concave portion 74 provided in the other face 50B. The leading end portion of the convex portion 96 provided on the attachment face 90 is in contact with the bottom portion of the concave portion 75 provided in the other face 50B. The leading end portion of the convex portion 97 provided on the attachment face 90 is in contact with the bottom portion of the concave portion 76 provided in the other face 50B. The leading end portion of the convex portion 98 provided on the attachment face 90 is in contact with the bottom portion of the concave portion 77 provided in the other face 50B.

Meanwhile, the leading end portion of the convex portion 61 provided on the other face 50B faces the bottom portion of the concave portion 101 provided in the attachment face 90 with a space therebetween. The leading end portion of the convex portion 62 provided on the other face 50B faces the bottom portion of the concave portion 102 provided in the attachment face 90 with a space therebetween. The leading end portion of the convex portion 63 provided on the other face 50B faces the bottom portion of the concave portion 103 provided in the attachment face 90 with a space therebetween. The leading end portion of the convex portion 64 provided on the other face 50B faces the bottom portion of the concave portion 104 provided in the attachment face 90 with a space therebetween. The leading end portion of the convex portion 65 provided on the other face 50B faces the bottom portion of the concave portion 105 provided in the attachment face 90 with a space therebetween. The leading end portion of the convex portion 66 provided on the other face 50B faces the bottom portion of the concave portion 106 provided in the attachment face 90 with a space therebetween. The leading end portion of the convex portion 67 provided on the other face 50B faces the bottom portion of the concave portion 107 provided in the attachment face 90 with a space therebetween. The leading end portion of the convex portion 68 provided on the other face 50B faces the bottom portion of the concave portion 108 provided in the attachment face 90 with a space therebetween.

In this way, the convex portions and the concave portions respectively provided in the attachment face 90 and the other face 50B are overlaid with each other, and it is thus possible for the leading end portion of the body 2A and the thickness M4 of the other face 50B side of the insert 5 to mutually overlap in the axial direction of the thread mill 1A. In this manner, the thread mill 1A can further shorten the length of protrusion of the insert portion 3 in the axial direction.

Further, as described above, the convex portions 91 to 98 on the attachment face 90 side are respectively in contact with the concave portions 71 to 78 on the insert 5 side, but the convex portions 61 to 68 on the insert 5 side are not in contact with the concave portions 101 to 108 on the attachment face 90 side. In this way, the insert 5 can be overlaid with the attachment face 90 in parallel to the attachment face 90 without any bias, and the insert portion 3 can be attached to the body 2A such that the insert portion 3 is orthogonal to the body 2A.

Figure 14:
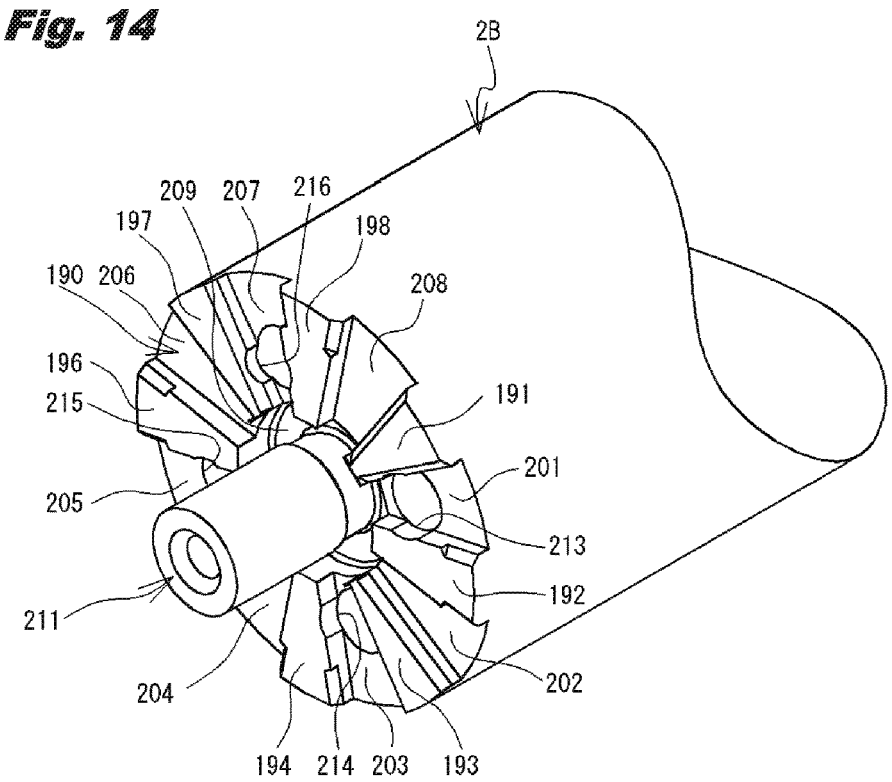
FIG. 14 is a partially enlarged perspective view of a leading end side of a body 2B.
Figure 15:
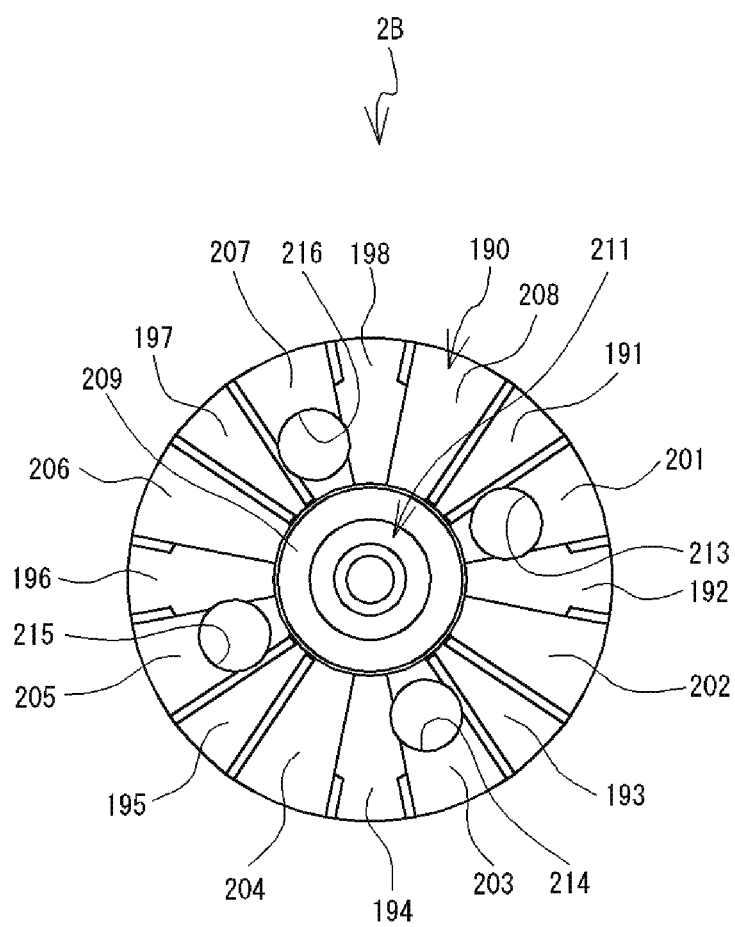
FIG. 15 is an end view of the leading end side of the body 2B.

A shape of an attachment face 190 of a body 2B will be explained with reference to FIG. 14 and FIG. 15. The circular attachment face 190 is provided on a leading end portion of the body 2B. The insert 4 (refer to FIG. 2 and FIG. 3) can be attached to the attachment face 190. A boss 211 and four screw holes 213 to 216 are provided in the attachment face 190. The boss 211 is provided in the center portion of the attachment face 190 and is formed in a substantially cylindrical shape extending along the axial line of the body 2B. The four screw holes 213 to 216 are respectively arranged in directions to form a cross around the boss 211 and are arranged in order in the clockwise direction. The four screws 8 (refer to FIG. 1) can be tightened in these screw holes 213 to 216.

The attachment face 190 is provided with a concave and convex shape corresponding to the concave and convex shape of both faces of the insert 4. Eight substantially fan-shaped convex portions 191 to 198, eight substantially fan-shaped concave portions 201 to 208, and a ring-shaped concave portion 209 are provided in the attachment face 190. The convex portions 191 and 192 are provided so as to sandwich the screw hole 213 from both sides in the circumferential direction. The convex portions 193 and 194 are provided so as to sandwich the screw hole 214 from both sides in the circumferential direction. The convex portions 195 and 196 are provided so as to sandwich the screw hole 215 from both sides in the circumferential direction. The convex portions 197 and 198 are provided so as to sandwich the screw hole 216 from both sides in the circumferential direction. Each of these convex portions 191 to 198 protrudes in parallel to the axial direction of the body 2B, and is formed to taper toward the boss 211 from the outer peripheral edge portion of the attachment face 190.

Meanwhile, the concave portions 201 to 208 are provided between each of the convex portions 191 to 198, and, in the axial direction of the body 2B, the concave portions 201 to 208 are formed to be lower than the convex portions 191 to 198 on the rear end side in the axial direction. The concave portion 201 is provided between the convex portions 191 and 192, the concave portion 202 is provided between the convex portions 192 and 193, the concave portion 203 is provided between the convex portions 193 and 194, the concave portion 204 is provided between the convex portions 194 and 195, the concave portion 205 is provided between the convex portions 195 and 196, the concave portion 206 is provided between the convex portions 196 and 197, the concave portion 207 is provided between the convex portions 197 and 198, and the concave portion 208 is provided between the convex portions 198 and 191, and each of the concave portions 201 to 208 is formed to taper toward the boss 211 from the outer peripheral edge portion of the attachment face 190. The screw hole 213 is provided on the boss 211 side of the concave portion 201, the screw hole 214 is provided on the boss 211 side of the concave portion 203, the screw hole 215 is provided on the boss 211 side of the concave portion 205, and the screw hole 216 is provided on the boss 211 side of the concave portion 207.

The ring-shaped concave portion 209 is provided in a ring shape along the outer periphery of the boss 211, and is connected to end portions of the concave portions 201 to 208 on the boss 211 side. In the axial direction of the body 2B, the ring-shaped concave portion 209 is formed to be lower than the concave portions 201 to 208 on the rear end side in the axial direction. The convex portions 191 to 198 and the concave portions 201 to 208 of the attachment face 190 also satisfy the above-described arrangement conditions of the convex portions and the concave portions.

Figure 19:
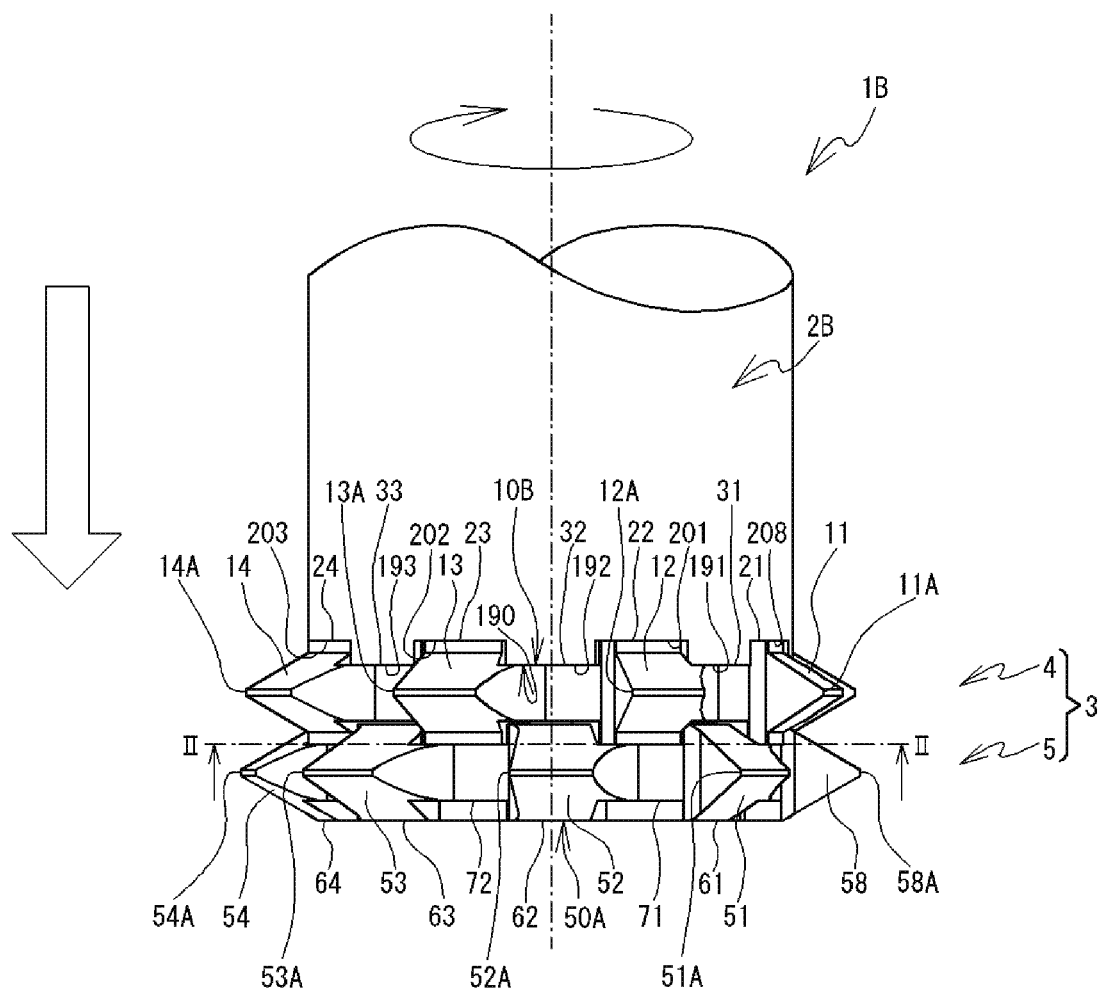
FIG. 19 is a side view of a leading end side of a thread mill 1B for right-hand cut up-cut milling.

A method for attaching the insert portion 3 to the body 2B will be explained with reference to FIG. 17 and FIG. 19. Here, the method for attaching the insert portion 3 to the body 2B will be explained with the object of forming a thread mill 1B shown in FIG. 19. As described above, the insert 4 can be attached to the body 2B. Thus, of the insert portion 3, the other face 10B side of the insert 4 is caused to face the attachment face 190 of the body 2B. Next, the boss 211 of the attachment face 190 is inserted in the shaft hole 41 of the insert 4 and the shaft hole 81 of the insert 5, in that order. Then, as shown in FIG. 19, the other face 10B of the insert 4 is overlaid with the attachment face 190. At this time, the other face 10B and the attachment face 190 are mating faces.

Figure 17:
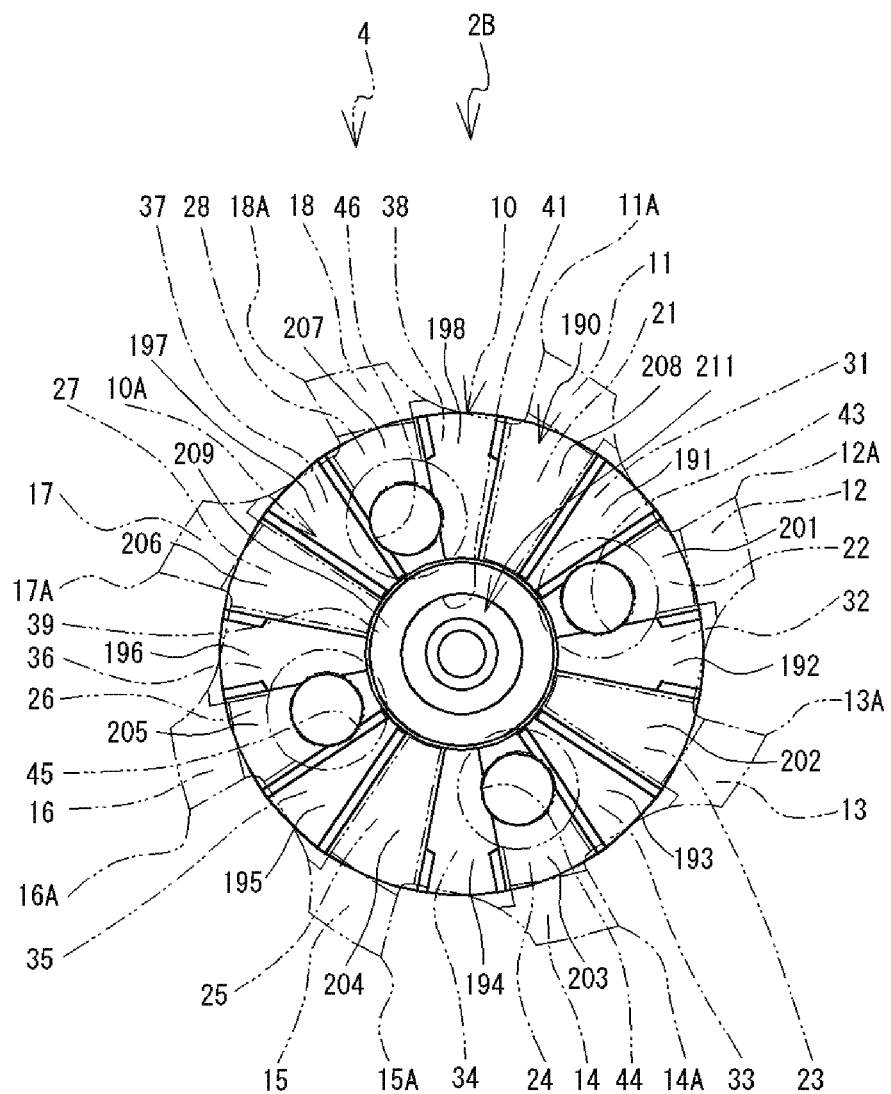
FIG. 17 is a diagram showing a state in which the insert 4 is overlaid on an attachment face 190 of the body 2B.

In FIG. 17, the attachment face 190 of the body 2B is shown using solid lines and the insert 4 is shown using two-dot chain lines. The convex portion 21 provided on the other face 10B of the insert 4 is inserted in the concave portion 208 provided in the attachment face 190. The convex portion 22 provided on the other face 10B is inserted in the concave portion 201 provided in the attachment face 190. The convex portion 23 provided on the other face 10B is inserted in the concave portion 202 provided in the attachment face 190. The convex portion 24 provided on the other face 10B is inserted in the concave portion 203 provided in the attachment face 190. The convex portion 25 provided on the other face 10B is inserted in the concave portion 204 provided in the attachment face 190. The convex portion 26 provided on the other face 10B is inserted in the concave portion 205 provided in the attachment face 190. The convex portion 27 provided on the other face 10B is inserted in the concave portion 206 provided in the attachment face 190. The convex portion 28 provided on the other face 10B is inserted in the concave portion 207 provided in the attachment face 190.

Meanwhile, the convex portion 191 provided on the attachment face 190 is inserted in the concave portion 31 provided in the other face 10B of the insert 4. The convex portion 192 provided on the attachment face 190 is inserted in the concave portion 32 provided in the other face 10B. The convex portion 193 provided on the attachment face 190 is inserted in the concave portion 33 provided in the other face 10B. The convex portion 194 provided on the attachment face 190 is inserted in the concave portion 34 provided in the other face 10B. The convex portion 195 provided on the attachment face 190 is inserted in the concave portion 35 provided in the other face 10B. The convex portion 196 provided on the attachment face 190 is inserted in the concave portion 36 provided in the other face 10B. The convex portion 197 provided on the attachment face 190 is inserted in the concave portion 37 provided in the other face 10B. The convex portion 198 provided on the attachment face 190 is inserted in the concave portion 38 provided in the other face 10B.

Next, the four screws 8 are respectively inserted in the insertion holes 83 to 86 of the insert 5 and the insertion holes 43 to 46 of the insert 4, and are respectively tightened in the screw holes 213 to 216 of the attachment face 190. In this way, the insert portion 3 is fixed with respect to the attachment face 190 of the body 2B, and the thread mill 1B, which will be described below, is configured.

Then, by mutually overlaying the convex portions and the concave portions respectively provided in the attachment face 190 and the other face 10B, it is possible for the leading end portion of the body 2B and the thickness M2 of the other face 10B side of the insert 4 to mutually overlap in the axial direction of the thread mill 1B. In this manner, the thread mill 1B can further shorten the length of protrusion of the insert portion 3 in the axial direction.

Although not explained in detail, it is acceptable that the leading end portions of the convex portions 191 to 198 on the attachment face 190 side are in contact, respectively, with the bottom portions of the concave portions 31 to 38 on the insert 4 side, and the leading end portions of the convex portions 21 to 28 on the insert 4 side are not in contact with the bottom portions of the concave portions 201 to 208 on the attachment face 190 side. In this case, the insert 4 can be overlaid with the attachment face 190 in parallel to the attachment face 190 without any bias, and the insert portion 3 can be attached to the body 2B such that the insert portion 3 is orthogonal to the body 2B.

Figure 20:
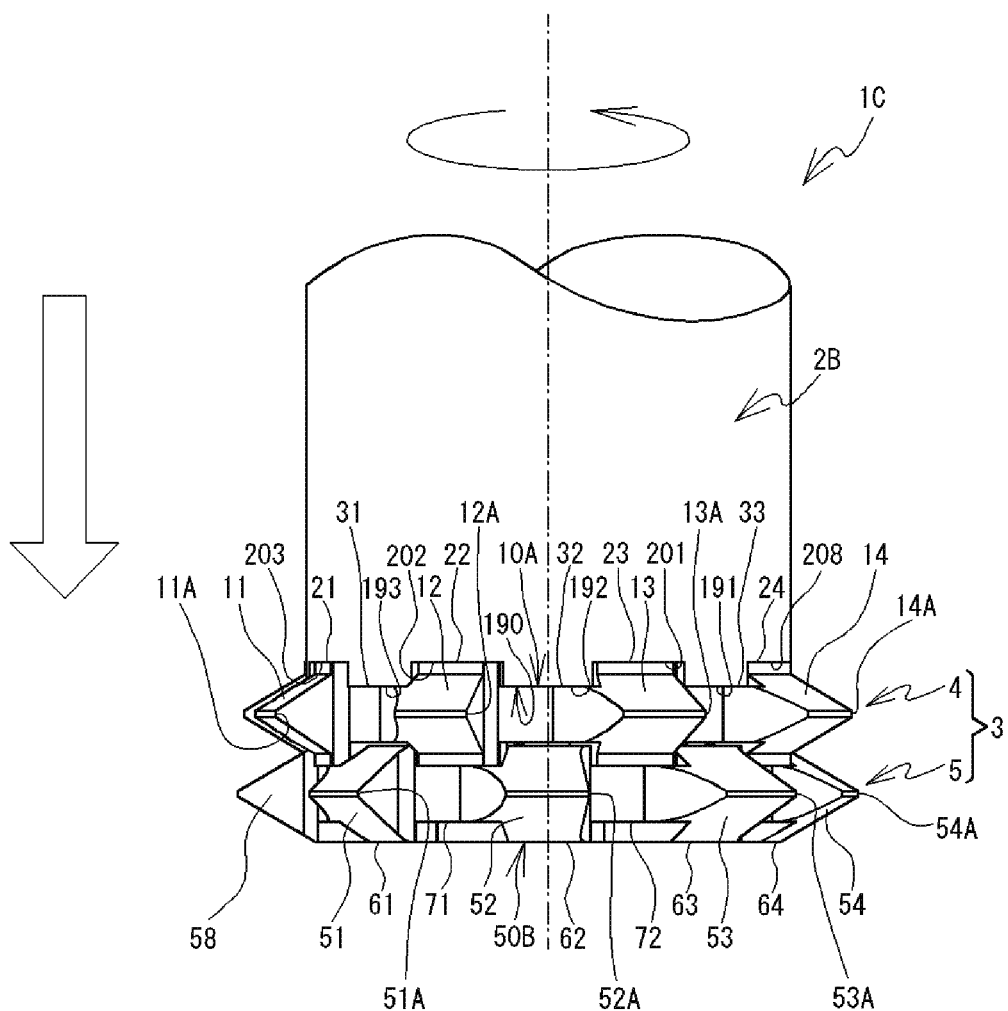
FIG. 20 is a side view of a leading end side of a thread mill 1C for left-hand cut down-cut milling.
Figure 21:
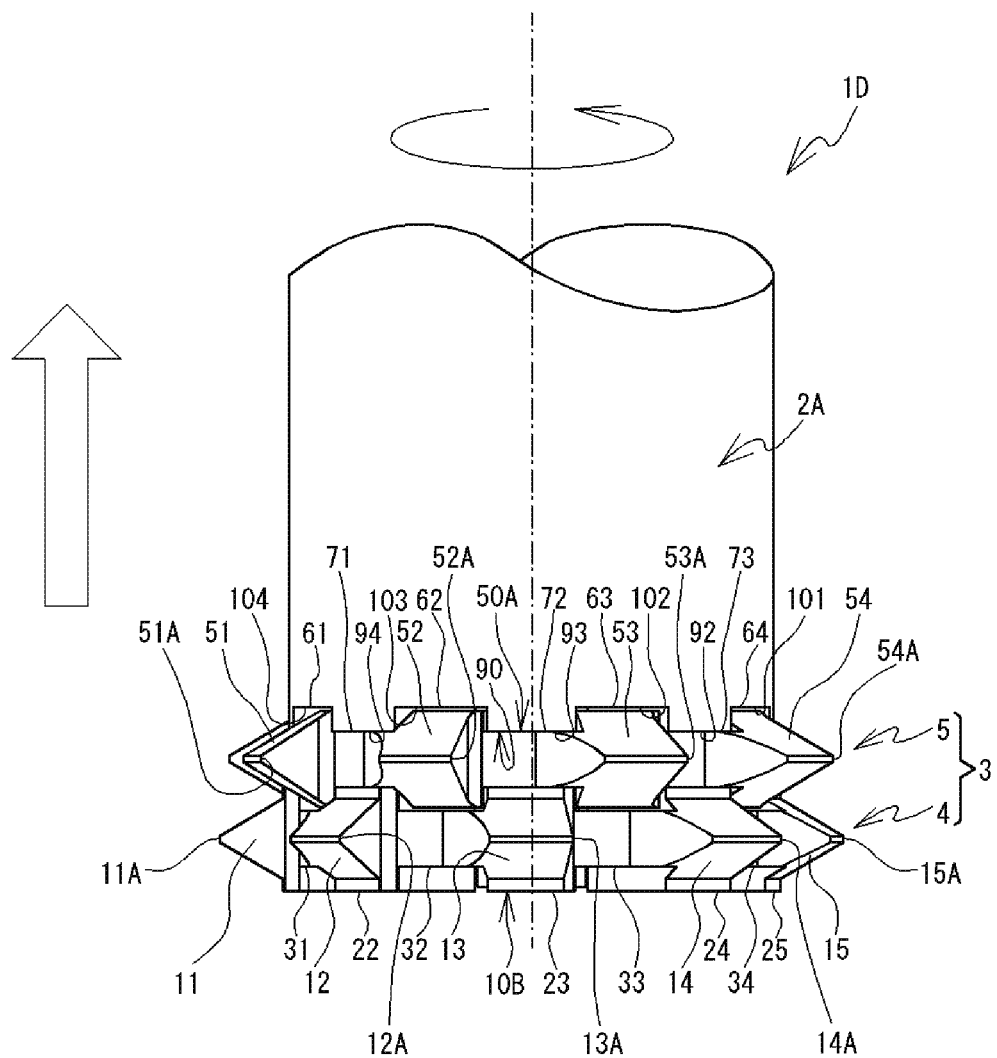
FIG. 21 is a side view of a leading end side of a thread mill 1D for left-hand cut up-cut milling.

Methods of cutting a female screw using the thread mills 1A to 1D will be explained with reference to FIG. 18 to FIG. 23. The thread mills of the present embodiment can achieve four types of cutting methods when cutting the female screw in the hole 6 (refer to FIG. 22) provided in the workpiece 7, by changing the order in which the inserts 4 and 5 configuring the insert portion 3 are overlaid with each other and by changing the orientation of the inserts 4 and 5. The thread mill 1A shown in FIG. 18 is a thread mill for right-hand cut down-cut milling. The thread mill 1B shown in FIG. 19 is a thread mill for right-hand cut up-cut milling. A thread mill 1C shown in FIG. 20 is a thread mill for left-hand cut down-cut milling. A thread mill 1D shown in FIG. 21 is a thread mill for left-hand cut up-cut milling. The female screw cut in the hole 6 is a right-hand thread.

The structure of the thread mill 1A will be explained with reference to FIG. 1 and FIG. 18. The thread mill 1A includes the insert portion 3 and the body 2A. In the insert portion 3, the blade tips 11A to 18A of the insert 4 and the blade tips 51A to 58A of the insert 5 are arranged such that both of them are right-hand cut (on the left side of the blade portions in FIG. 18), and are overlaid with each other so that the insert 4 is on the lower side and the insert 5 is on the upper side. Then, the other face 50B (refer to FIG. 8) of the insert 5 positioned on the upper side of the insert portion 3 is attached to the attachment face 90 of the body 2A.

Figure 22:
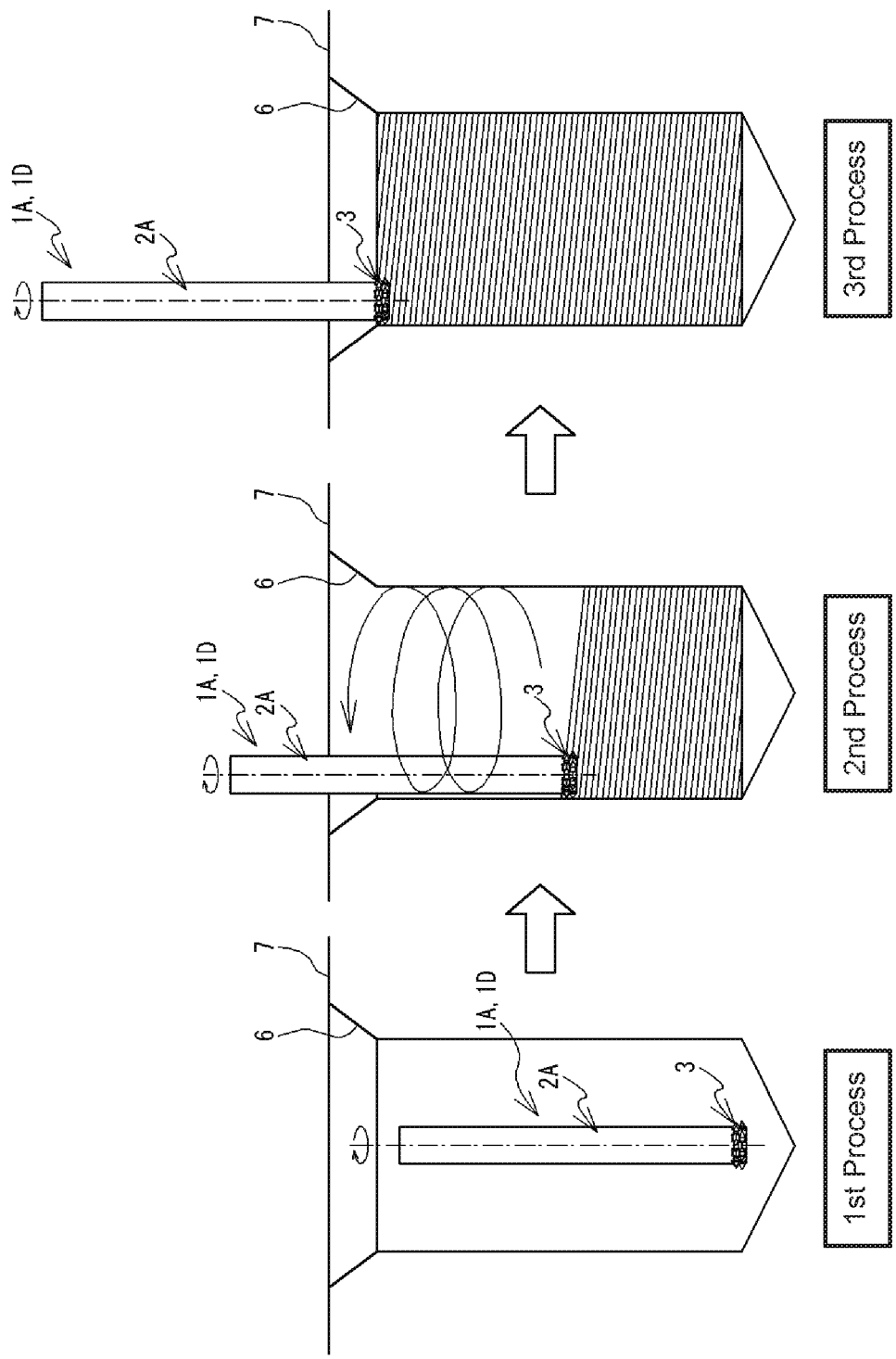
FIG. 22 is a diagram showing a process of cutting a screw by the right-hand cut down-cut milling.

A cutting process for cutting the female screw by the right-hand cut down-cut milling using the thread mill 1A will be explained with reference to FIG. 22. The cutting process includes a first process, a second process, and a third process. The cutting process is performed using a machine tool (not shown in the drawings), and a direction parallel to the axial direction of the thread mill mounted on a main shaft of the machine tool is a Z-axis direction.

In the first process, the main shaft is lowered in the Z-axis direction, and the insert portion 3 of the thread mill 1A is inserted in the hole 6 formed in advance in the workpiece 7, to a machining depth of the screw to be formed. Then, the thread mill 1A is caused to rotate in the clockwise direction as seen from the rear end side in the axial direction. In the second process, the main shaft is raised in a spiral manner along an inner peripheral surface of the hole 6, while being caused to rotate in the counterclockwise direction. At this time, the thread mill 1A is raised in the Z-axis direction by a specified height for each rotation. In the third process, the cutting is performed up to the mouth of the screw, and is completed. In this way, the right-hand thread is formed in the inner peripheral surface of the hole 6. The right-hand cut down-cut milling has, for example, an advantage that there is no impact by the volume of chips, which is an effective point for tool life. Then, the insert 5 is for rough machining and the insert 4 is for finish machining, so the thread mill 1A can simultaneously perform the rough machining and the finish machining in one pass of the right-hand cut down-cut milling. As a result, an operator can perform the cutting operation of the female screw in a short amount of time using the thread mill 1A.

A structure of the thread mill 1B will be explained with reference to FIG. 19. The thread mill 1B includes the insert portion 3 and the body 2B. In the insert portion 3, the blade tips 11A to 18A of the insert 4 and the blade tips 51A to 58A of the insert 5 are arranged such that both of them are right-hand cut, and are overlaid with each other so that the insert 4 is on the upper side and the insert 5 is on the lower side. In this insert portion 3, the one face 10A of the insert 4 and the other face 50B of the insert 5 are the mating faces. Then, the other face 10B of the insert 4 positioned on the upper side of the insert portion 3 is attached to the attachment face 190 of the body 2B.

Figure 23:
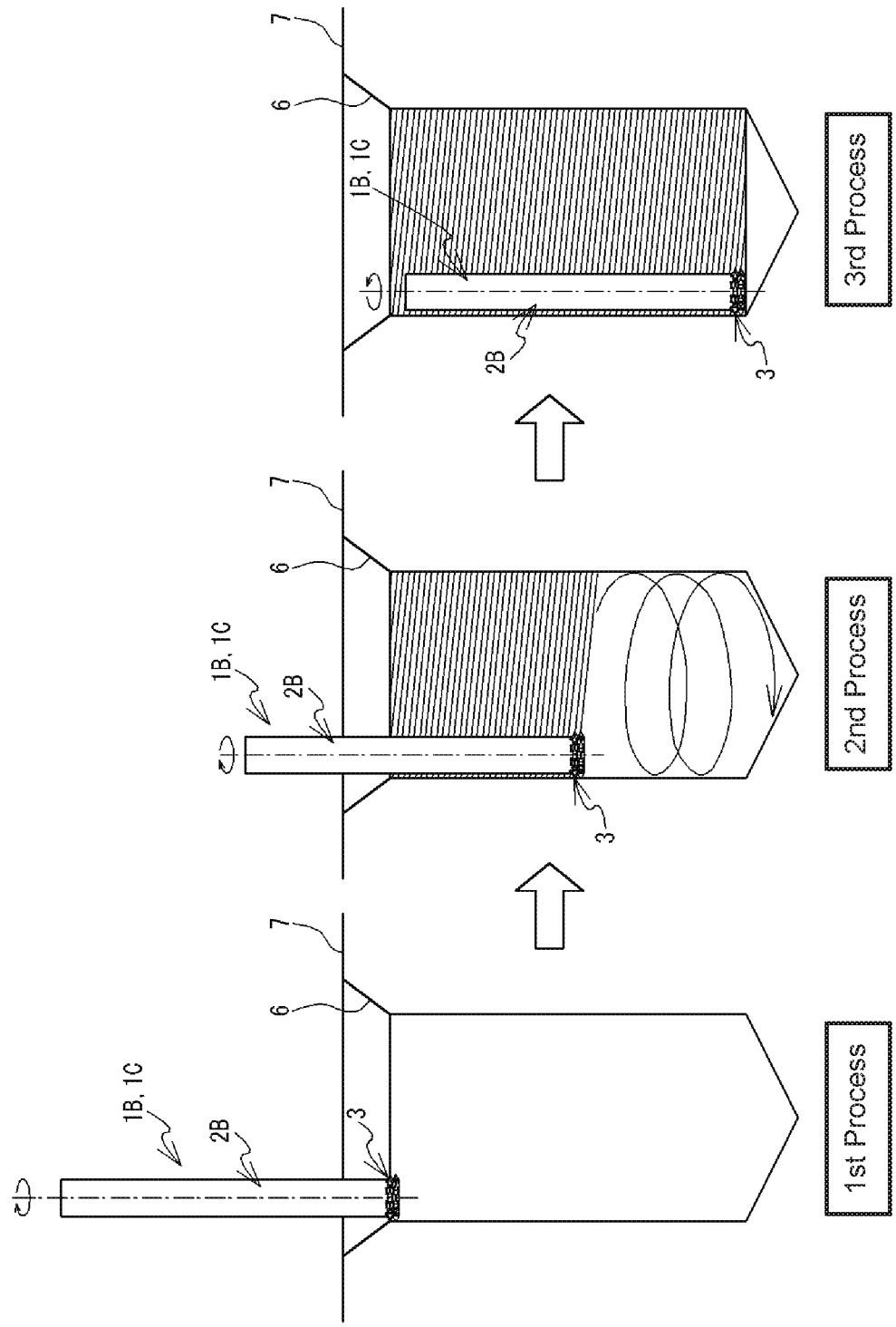
FIG. 23 is a diagram showing a process of cutting the screw by the right-hand cut up-cut milling.

A cutting process for cutting the female screw by the right-hand cut up-cut milling using the thread mill 1B will be explained with reference to FIG. 23. The cutting process includes a first process, a second process, and a third process, and a procedure is reversed from that of the right-hand cut down-cut milling. In the first process, the main shaft is lowered in the Z-axis direction, and the insert portion 3 of the thread mill 1B is positioned at a section corresponding to the mouth of the female screw to be formed in the hole 6. Then, the thread mill 1B is caused to rotate in the clockwise direction as seen from the rear end side in the axial direction. In the second process, the main shaft is lowered in a spiral manner along the inner peripheral surface of the hole 6, while being caused to rotate in the clockwise direction. At this time, the thread mill 1B is lowered in the Z-axis direction by a specified height for each rotation. In the third process, the cutting is performed to the machining depth of the screw, and is completed. In this way, the right-hand thread is formed in the inner peripheral surface of the hole 6. The right-hand cut up-cut milling has an advantage that there is less likelihood of an impact by chips during cutting and the finished surface is improved. Then, as described above, the insert 5 is for the rough machining and the insert 4 is for the finish machining, so the thread mill 1B can simultaneously carry out the rough machining and the finish machining in one pass of the right-hand cut up-cut milling. As a result, the operator can perform the cutting operation of the female screw in a short amount of time using the thread mill 1B.

A structure of the thread mill 1C will be explained with reference to FIG. 20. The thread mill 1C includes the insert portion 3 and the body 2B. In the insert portion 3, the blade tips 11A to 18A of the insert 4 and the blade tips 51A to 58A of the insert 5 are arranged such that both of them are left-hand cut (on the right side of the blade portions in FIG. 20), and are overlaid with each other so that the insert 4 is on the upper side and the insert 5 is on the lower side. In this insert portion 3, the other face 10B of the insert 4 and the one face 50A of the insert 5 are the mating faces. Then, the one face 10A of the insert 4 positioned on the upper side of the insert portion 3 is attached to the attachment face 190 of the body 2B.

A cutting process for cutting the female screw by the left-hand cut down-cut milling using the thread mill 1C will be explained with reference to FIG. 23. Similarly to the right-hand cut up-cut milling shown in FIG. 23, the cutting process includes a first process, a second process, and a third process. In the first process, the main shaft is lowered in the Z-axis direction, and the insert portion 3 of the thread mill 1C is positioned at a section corresponding to the mouth of the female screw to be formed in the hole 6. Then, the thread mill 1C is caused to rotate in the counterclockwise direction as seen from the rear end side in the axial direction. This is the reverse direction to the rotation direction of the tool shown in FIG. 23.

In the second process, the main shaft is lowered in a spiral manner along the inner peripheral surface of the hole 6, while being caused to rotate in the clockwise direction. In the third process, the cutting is performed up to the machining depth of the screw, and is completed. In this way, the right-hand thread is formed in the hole 6. The left-hand cut down-cut milling has, for example, an advantage that there is less likelihood of impact by chips during cutting, which is an effective point for tool life. Further, the insert 5 is for the rough machining and the insert 4 is for the finish machining, so the thread mill 1C can perform the combined machining in which the rough machining and the finish machining are simultaneously performed in one pass of the left-hand cut down-cut milling.

A structure of the thread mill 1D will be explained with reference to FIG. 21. The thread mill 1D includes the insert portion 3 and the body 2A. In the thread mill 1D, the blade tips 11A to 18A of the insert 4 and the blade tips 51A to 58A of the insert 5 are arranged such that both of them are left-hand cut (on the right side of the blade portions in FIG. 21), and are overlaid with each other so that the insert 4 is on the lower side and the insert 5 is on the upper side. In this insert portion 3, the other face 50B of the insert 5 and the one face 10A of the insert 4 are the mating faces. Then, the one face 50A of the insert 5 positioned on the upper side of the insert portion 3 is attached to the attachment face 90 of the body 2A.

A cutting process for cutting the female screw by the left-hand cut up-cut milling using the thread mill 1D will be explained with reference to FIG. 22. Similarly to the right-hand cut down-cut milling shown in FIG. 22, the cutting process includes a first process, a second process, and a third process. In the first process, the main shaft is lowered in the Z-axis direction, and the insert portion 3 of the thread mill 1D is inserted into the hole 6 formed in advance in the workpiece 7, to a machining depth of the screw to be formed. Then, the thread mill 1D is caused to rotate in the counterclockwise direction as seen from the rear end side in the axial direction. This is the reverse direction to the rotation direction of the tool shown in FIG. 22.

In the second process, the main shaft is raised in a spiral manner along the inner peripheral surface of the hole 6, while being caused to rotate in the counterclockwise direction. In the third process, the cutting is performed up to the mouth of the screw, and is completed. In this way, the right-hand thread is formed in the inner peripheral surface of the hole 6. The left-hand cut up-cut milling has an advantage that it is not affected by the volume of chips and the finished surface is improved. Then, as described above, the insert 5 is for the rough machining and the insert 4 is for the finish machining, so the thread mill 1D can perform the rough machining and the finish machining simultaneously in one pass of the left-hand cut up-cut milling. As a result, the operator can perform the cutting operation of the female screw in a short amount of time using the thread mill 1D.

In this way, the thread mill of the present embodiment can achieve the four types of cutting methods of the female screw formed in the hole 6 provided in the workpiece 7, by changing the order in which the inserts 4 and 5 configuring the insert portion 3 are overlaid with each other and by changing the orientation of the inserts 4 and 5.

A pitch adjustment method of the insert portion 3 will be explained with reference to FIG. 8 and FIG. 24 to FIG. 27.

As shown in FIG. 8, a pitch P1 of the insert portion 3 is a distance between the blade portions 11 to 18 of the insert 4 and the blade portions 51 to 58 of the insert 5. To adjust the pitch of the insert portion 3, the following three methods can be used, for example.

First Pitch Adjustment Method

Figure 24:
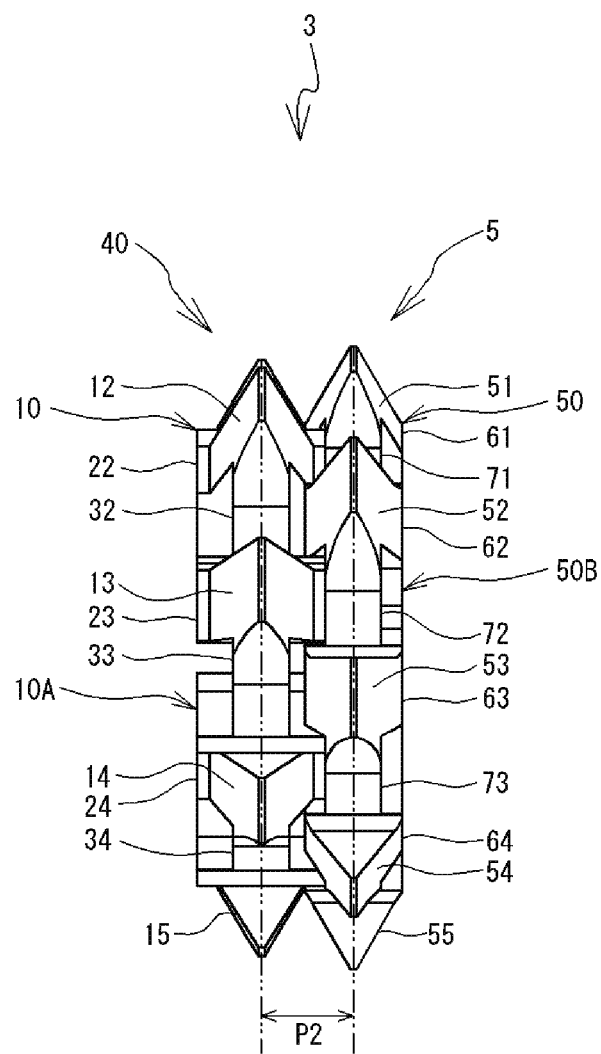
FIG. 24 is a side view of the insert portion 3 created by overlaying an insert 40 and the insert 5.

A first pitch adjustment method is a method in which inserts having different thicknesses are overlaid. As shown in FIG. 24, in the insert portion 3, an insert 40, which is thicker than the insert 4 shown in FIG. 8, can replace the insert 4 and be overlaid with the insert 5. In this case, a pitch P2 of the insert portion 3 is a distance between the blade portions 11 to 18 of the insert 40 and the blade portions 51 to 58 of the insert 5. The pitch P2 is longer than the pitch P1. When the pitch is made shorter, an insert that is thinner than the insert 4 may be overlaid. Further, the insert 5 may be replaced by an insert having a different thickness. Thus, the pitch of the insert portion 3 can be easily changed by the first pitch adjustment method.

Second Pitch Adjustment Method

Figure 26:
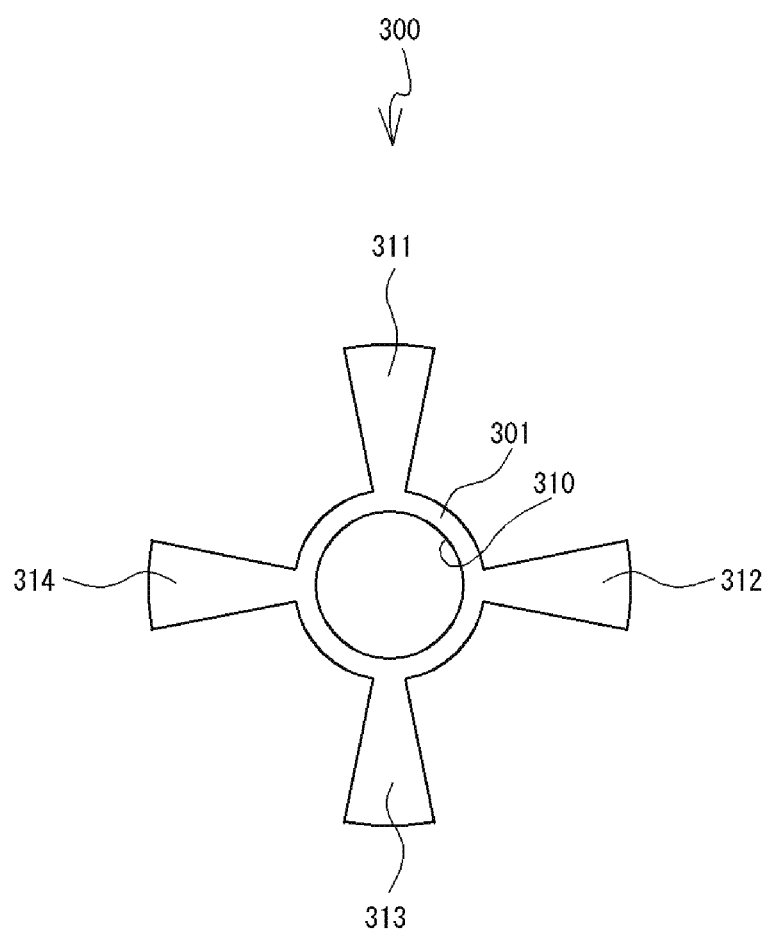
FIG. 26 is a plan view of the spacer 300.

As shown in FIG. 25, a second pitch adjustment method is a method in which a spacer 300 is placed between the inserts 4 and 5. As shown in FIG. 26, the spacer 300 includes a ring-shaped portion 301 and four vane portions 311 to 314. The ring-shaped portion 301 is formed in a ring shape with a shaft hole 310 provided in the center of the ring-shaped portion 301. The four vane portions 311 to 314 are arranged at equal intervals on the ring-shaped portion 301, and each of the four vane portions 311 to 314 is formed in a substantial fan shape whose width widens from the inside toward the outside in a radial direction. The shape of the vane portions 311 to 314 corresponds to the shape of the concave portions of the insert 5.

Figure 27:
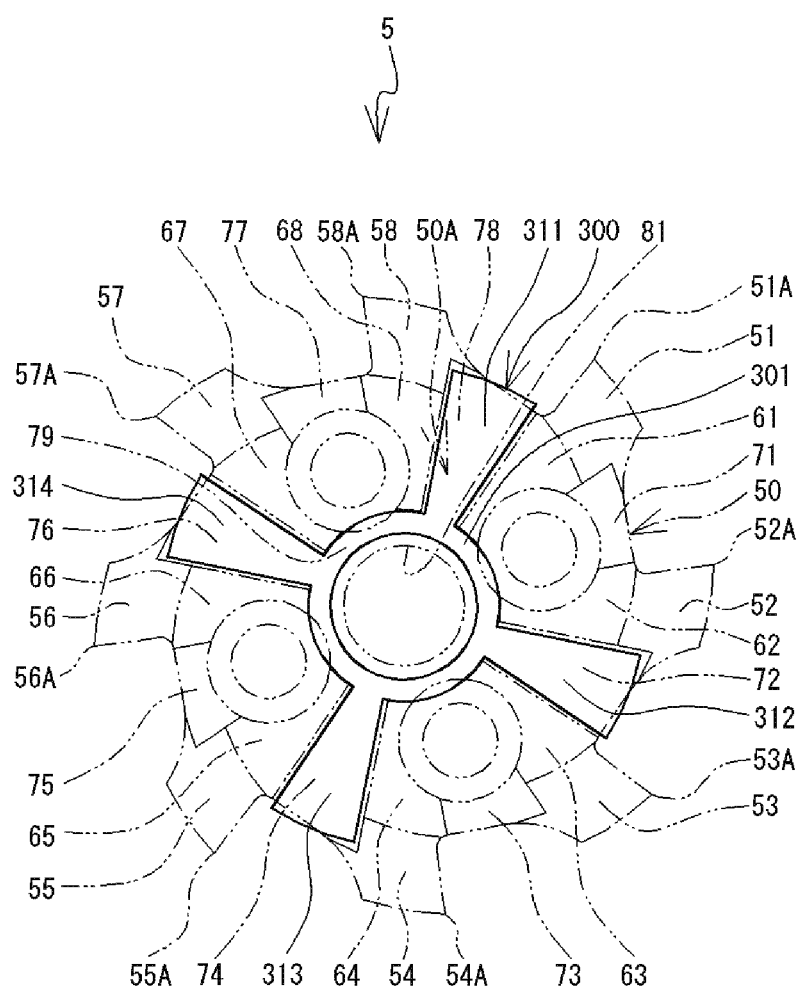
FIG. 27 is a diagram showing a state in which the spacer 300 is arranged on the insert 5.

In FIG. 27, the spacer 300 is shown using solid lines, and the insert 5 is shown using two-dot chain lines. For example, the spacer 300 is arranged on the one face 50A that is the mating face of the insert 5. At this time, the ring-shaped portion 301 of the spacer 300 is arranged in the ring-shaped concave portion 79 of the one face 50A, the vane portion 311 is arranged in the concave portion 78 of the one face 50A, the vane portion 312 is arranged in the concave portion 72 of the one face 50A, the vane portion 313 is arranged in the concave portion 74 of the one face 50A, and the vane portion 314 is arranged in the concave portion 76 of the one face 50A. Then, the other face 10B (refer to FIG. 8 and FIG. 9) of the insert 4 is overlaid with respect to the one face 50A of the insert 5 on which the spacer 300 has been arranged.

At that time, the leading end portion of the convex portion 21 of the insert 4 is in contact with the bottom portion of the concave portion 78 of the insert 5 via the vane portion 311 of the spacer 300. The leading end portion of the convex portion 23 of the insert 4 is in contact with the bottom portion of the concave portion 72 of the insert 5 via the vane portion 312 of the spacer 300. The leading end portion of the convex portion 25 of the insert 4 is in contact with the bottom portion of the concave portion 74 of the insert 5 via the vane portion 313 of the spacer 300. The leading end portion of the convex portion 27 of the insert 4 is in contact with the bottom portion of the concave portion 76 of the insert 5 via the vane portion 314 of the spacer 300. For example, when the thickness of the insert 4 is 5 mm, the thickness of the insert 5 is 4 mm, and the thickness of the spacer 300 is 0.5 mm, in contrast to the total 9.5 mm of the individual thicknesses of the inserts 4 and 5, the total thickness when the inserts 4 and 5 are overlaid with each other is 8.5 mm. A length of mutual overlap in the thickness direction of the inserts 4 and 5 in this case is 1 mm. A pitch P3 of the insert portion 3 is a distance obtained by adding the thickness of the spacer 300 to the pitch P1. The pitch P3 is longer than the pitch P1. When making the pitch even longer, a spacer that is thicker than the spacer 300 may be overlaid, or a plurality of the spacers 300 may be overlaid. In this way, by changing the thickness or the number of the spacers 300, it is possible to easily change to a different pitch even with the same inserts 4 and 5. Thus, the pitch of the insert portion 3 can also be easily changed by the second pitch adjustment method.

Third Pitch Adjustment Method

The pitch of the insert portion 3 can be changed by overlaying, with respect to the insert 4, an insert (not shown in the drawings, having the same L2) in which the distances N3 and N4 (refer to FIG. 7) of the insert 5 have been changed. The pitch of the insert portion 3 can also be changed by overlaying, with respect to the insert 5, an insert (not shown in the drawings, having the same L1) in which the distances N1 and N2 of the insert 4 have been changed.

In the above explanation, the attachment faces 90 and 190 of the bodies 2A and 2B correspond to a "contact face" of the present invention, the virtual straight lines A1 and A2 correspond to "first virtual straight lines" of the present invention, and the virtual straight lines B1 and B2 correspond to "second virtual straight lines" of the present invention.

As described above, the thread mill 1A of the present embodiment includes the body 2A, the insert portion 3, and the four screws 8. The screws 8 detachably fix the insert portion 3 to the leading end portion of the body 2A. The insert portion 3 is configured by the disc-shaped inserts 4 and 5 being coaxially overlaid with each other. The convex portions 21 to 28 and the concave portions 31 to 38 are provided on each of both the faces of the insert 4. Each of the convex portions 21 to 28 protrudes on both sides of the insert 4 in the thickness direction from the center of the insert 4 in the thickness direction, and each of the convex portions 21 to 28 is a portion that is most separated from the center. The concave portions 31 to 38 are provided in sections excluding the convex portions 21 to 28 and are sections that are lower than the convex portions 21 to 28. The convex portions 61 to 68 and the concave portions 71 to 78 are provided on each of both the faces of the insert 5. Each of the convex portions 61 to 68 protrudes on both sides of the insert 5 in the thickness direction from the center of the insert 5 in the thickness direction, and each of the convex portions 61 to 68 is a portion that is most separated from the center. The concave portions 71 to 78 are provided in sections excluding the convex portions 61 to 68 and are sections that are lower than the convex portions 61 to 68. When the inserts 4 and 5 are overlaid with each other, each of the convex portions 21 to 28 provided on the mating face of the insert 4 is inserted in one of the concave portions 71 to 78 provided in the mating face of the insert 5. Each of the convex portions 61 to 68 provided on the mating face of the insert 5 is inserted in one of the concave portions 31 to 38 provided in the mating face of the insert 4.

Thus, since the insert portion 3 can be configured by combining the inserts 4 and 5 for the differing usage applications, the thread mill 1A can perform the combined machining on the workpiece. Further, since the type of the blade portion can be changed by changing the combination of the inserts, it is possible to expand the variations of the combined machining. In addition, since the inserts 4 and 5 in the insert portion 3 partially overlap with each other in their respective thickness directions, the thickness of the insert portion 3 can be smaller than a sum of the individual thicknesses of the inserts 4 and 5. As a result, the thread mill 1A can shorten a protrusion length of the insert portion 3, and thus it is possible to improve tool rigidity and to suppress run-out occurring at a time of rotation.

In addition, in the above-described embodiment, the convex portions 21 to 28 provided on the insert 4 are provided between the blade portions 11 to 18 and the shaft hole 41 of the insert 4. Specifically, the thick convex portions 21 to 28 of the insert 4 are respectively arranged in correspondence to the blade portions 11 to 18. As a result, the thread mill 1A can improve the rigidity of an outer peripheral section of the insert 4 that supports the blade portions 11 to 18.

Further, in the above-described embodiment, for example, the shaft hole 81, which penetrates the insert 5 in the thickness direction, is provided in the central portion of the insert 5. Meanwhile, the attachment face 90, which is in contact with one face of the insert 5, is provided on the leading end portion of the body 2A, and the boss 111, which is inserted in the shaft hole 81, is provided in the center of the attachment face 90 such that the boss 111 protrudes in the axial direction of the body 2A. For example, when the insert 5 is fixed to the attachment face 90 of the body 2A, the boss 111 on the body 2A side is inserted in the shaft hole 81 of the insert 5, and the insert 5 is fixed using the four screws 8 in a state in which the one face of the insert 5 is in contact with the attachment face 90 of the body 2A. In this way, the thread mill 1A can easily determine the position of the insert 5 with respect to the leading end portion of the body 2A, and the operation to attach the insert 5 to the body 2A can be performed efficiently.

Further, in the above-described embodiment, the convex portions 91 to 98 and the concave portions 101 to 108 are provided on the attachment face 90. The convex portions 91 to 98 are provided in positions corresponding to the concave portions 71 to 78 provided in the one face of the insert 5. The concave portions 101 to 108 are provided in positions corresponding to the convex portions 61 to 68 provided on the insert 5. When the one face of the insert 5 is caused to be in contact with the attachment face 90, each of the convex portions 61 to 68 provided on the one face of the insert 5 is inserted in one of the concave portions 101 to 108 provided in the attachment face 90. As a result, the thread mill 1A can further shorten the protrusion length of the insert portion 3.

Furthermore, in the above-described embodiment, the four insertion holes 83 to 86 are provided in the insert 5, and the screw holes 113 to 116 are provided in the attachment face 90 in positions corresponding to the insertion holes 83 to 86. Thus, by respectively inserting the four screws 8 in the four insertion holes 83 to 86 and tightening the screws 8 in the screw holes 113 to 116 of the attachment face 90, the thread mill 1A can strongly fix the insert 5 with respect to the body 2A.

In addition, in the above-described embodiment, the leading end portions of the convex portions 21 to 28 provided on the mating face of the insert 4 are in contact with the bottom portions of the concave portions 71 to 78 provided in the mating face of the insert 5, but the leading end portions of the convex portions 61 to 68 provided on the mating face of the insert 5 are not in contact with the bottom portions of the concave portions 31 to 38 provided in the mating face of the insert 4. In this way, the mating face of the insert 4 and the mating face of the insert 5 can be overlaid in parallel with each other without any wobble. As a result, it is possible to make uniform the thickness of the insert portion 3 configured by overlaying the plurality of inserts.

Further, in the above-described embodiment, when, in each of both the faces of the inserts configuring the insert portion 3, the number of the convex portions and the number of the concave portions are the same number n, the minimum angle indicated by two virtual straight lines when the two virtual straight lines from a center portion of the insert contact outermost peripheral edge portions of the convex portion and include the whole of the convex portion between the two virtual straight lines is X, and a maximum angle between two virtual straight lines when the two virtual straight lines from the center portion contact the outermost peripheral edge portions of the concave portion and do not include the convex portion between the two virtual straight lines is Y, the insert satisfies all of the following conditions:

(1) X is less than Y.
(2) A sum of Xs of the n number of convex portions is less than 180°.
(3) A sum of Ys of the n number of concave portions is greater than 180°.
(4) Among Xs of the n number of convex portions, a maximum angle $X_{max}$ is less than 180/n°.
(5) Among Ys of the n number of concave portions, a maximum angle $Y_{max}$ is greater than 180/n°.

By satisfying all of the above conditions, the convex portions and the concave portions provided in each of both the faces of the insert can be overlaid with the concave portions and the convex portions of the other insert even if the insert is reversed. Further, since the mutually adjacent X+Y are evenly divided when the adjacent X+Y are 360/5, the convex portions and the concave portions can be overlapped without interference in any position.

In addition, in the above-described embodiment, the insert 5 is the insert for rough machining and includes the blade portions 51 to 58 for the rough machining, while the insert 4 is the insert for finish machining and includes the blade portions 11 to 18 for the finish machining. Thus, by configuring the insert portion 3 by combining them, the thread mill 1A can perform the combined machining in which the rough machining and the finish machining are simultaneously performed.

Further, in the above-described embodiment, in the insert portion 3, the pitch of the inserts 4 and 5 can be easily adjusted by switching between the inserts having different thicknesses.

In addition, in the above-described embodiment, the pitch of the inserts 4 and 5 can be easily adjusted by placing the spacer 300 having a different thickness between the insert 4 and the insert 5.

Furthermore, in the above-described embodiment, the pitch of the insert portion 3 can be easily changed by overlaying, with respect to the insert 4, the insert (not shown in the drawings, having the same L2) in which the length N3 from the center of the insert 5 in the thickness direction to each of the bottom portions of the concave portions 71 to 78 on the one face 50A side and the length N4 from the center of the insert 5 in the thickness direction to each of the bottom portions of the concave portions 71 to 78 on the other face 50B side have been changed. The pitch of the insert portion 3 can also be easily changed by overlaying, with respect to the insert 5, the insert (not shown in the drawings, having the same L1) in which the distances N1 and N2 of the insert 4 have been changed.

It goes without saying that the present invention is not limited to any of the specific configurations of the above-described embodiment. In the above-described embodiment, the thread mills 1A to 1D are configured by combining the inserts 4 and 5 with each other, but a special thread mill that can perform surface machining can be configured, for example, by combining the insert for thread milling with an insert for end milling.

Figure 28:
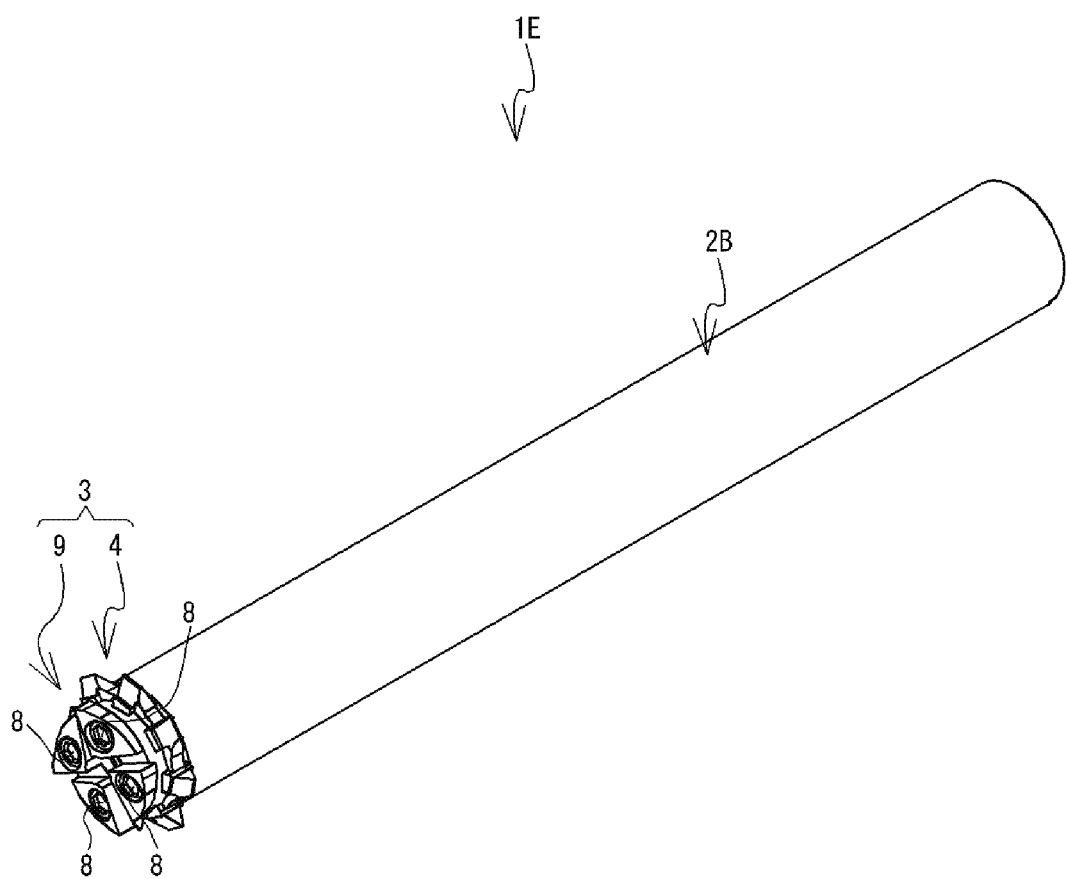
FIG. 28 is a perspective view of a special thread mill 1E.
Figure 29:
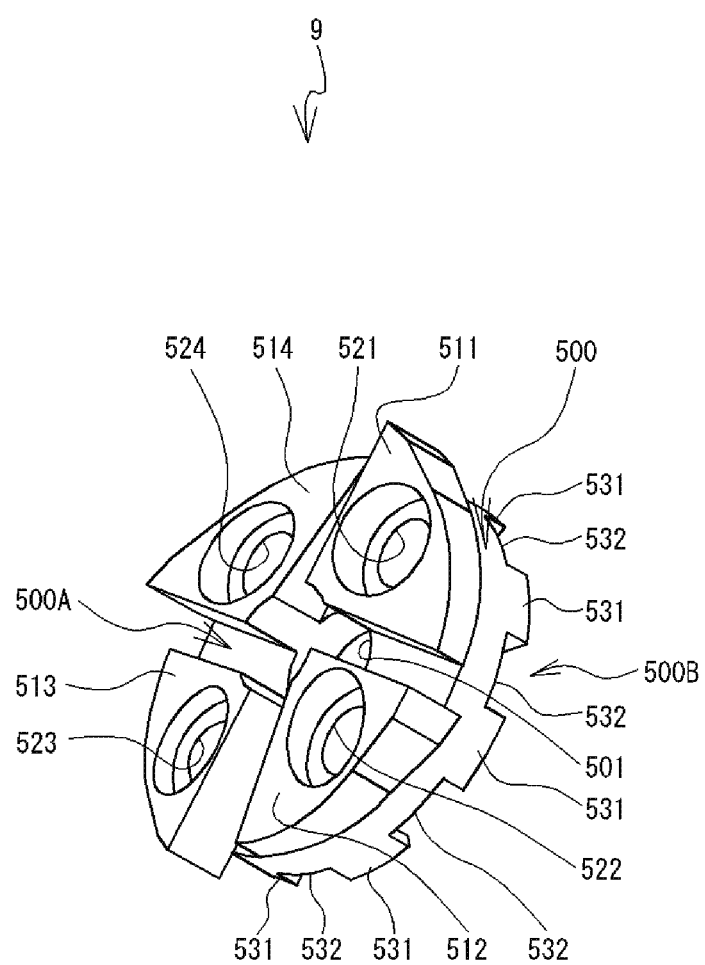
FIG. 29 is a perspective view of an insert 9.

For example, a special thread mill 1E shown in FIG. 28 includes the body 2B and the insert portion 3. The insert portion 3 is configured by combining the insert 4 of the above-described embodiment with an insert 9 for end milling. As shown in FIG. 29, the insert 9 includes an insert main body 500 and four blade portions 511 to 514. The insert main body 500 is formed in a substantial disc shape having a specified thickness, and includes one face 500A and another face 500B. The insert main body 500 includes a shaft hole 501 and four insertion holes 521 to 524. The shaft hole 501 is provided in a center portion of the insert main body 500, and penetrates the one face 500A and the other face 500B. The boss 211 (refer to FIG. 14), which is provided on the leading end portion of the body 2B, is inserted in the shaft hole 501.

The four blade portions 511 to 514 are provided on the one face 500A of the insert main body 500, and are arranged around the shaft hole 501 at mutually equal intervals in the circumferential direction. Each of the blade portions 511 to 514 is formed in a substantial fan shape as viewed from the leading end side in the axial direction. The insertion holes 521 to 524 are respectively provided in substantially the center of each of the blade portions 511 to 514. The four screws 8 (refer to FIG. 28) are inserted in the insertion holes 521 to 524. Then, eight convex portions 531 and eight concave portions 532 are alternately provided in the circumferential direction around the shaft hole 501 in the other face 500B of the insert main body 500, thus forming, for example, the same concave and convex shape as the concave and convex shape provided on both the faces of the insert 5 of the above-described embodiment. The eight convex portions 531 and the eight concave portions 532 satisfy the arrangement conditions of the convex portions and the concave portions of the above-described embodiment.

Figure 30:
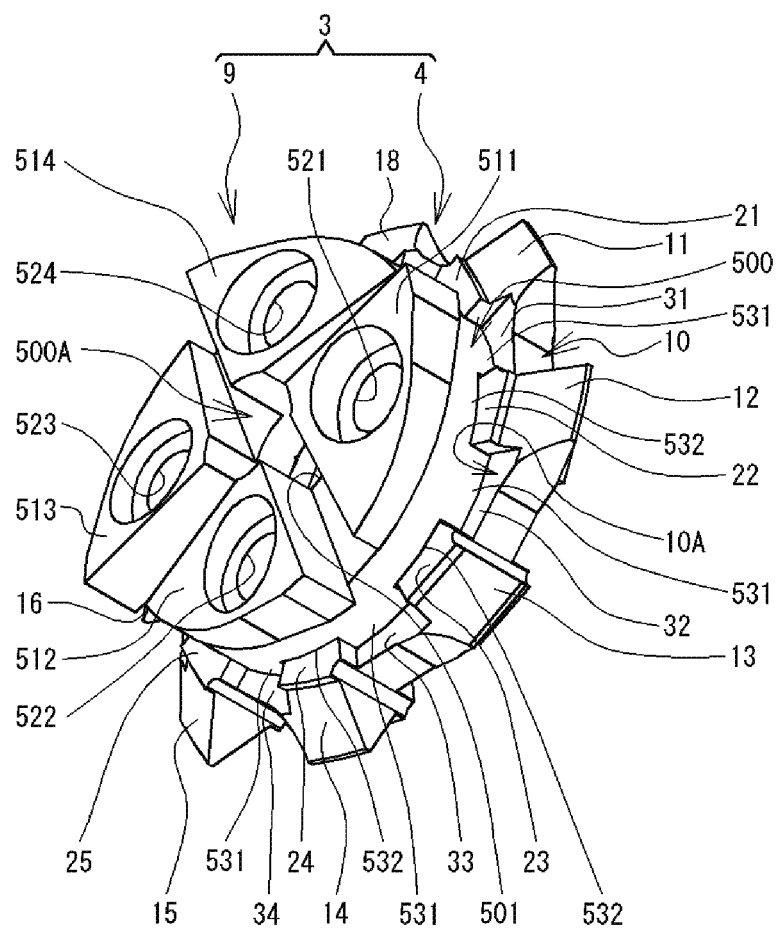
FIG. 30 is a perspective view of the insert portion 3 in which the inserts 4 and 9 are combined.

As shown in FIG. 30, the other face 500B of the insert 9 provided with the above-described concave and convex shape is caused to face the one face 10A of the insert 4, and the insert 9 and the insert 4 are overlaid with each other. At that time, the other face 500B and the one face 10A are the mating faces. Then, the eight convex portions 531 provided on the other face 500B are respectively inserted in the concave portions 31 to 38 provided in the one face 10A. Meanwhile, the convex portions 21 to 28 provided on the one face 10A are respectively inserted in the eight concave portions 532 provided in the other face 500B. In this way, the inserts 4 and 9 are coaxially overlaid with each other and the insert portion 3 is configured.

Then, similarly to the above-described embodiment, the insert 4 side of the insert portion 3 is caused to be in contact with the attachment face 190 of the body 2B, and is attached by the four screws 8, thus configuring the special thread mill 1E (refer to FIG. 28). By changing the concave and convex shape of the other face 500B of the insert 9, the insert 9 can be overlaid with another insert. With this type of the special thread mill 1E, the same effects as those of the thread mill 1A of the above-described embodiment can be obtained.

Various modifications can be made to the present invention in addition to the above-described modified example. The above-described embodiment describes a thread mill, but can be applied to another tool, such as a T-slot cutter, a reamer, an end mill, or the like.

The insert portion 3 of the above-described embodiment is configured by coaxially overlaying the two inserts 4 and 5, but the insert portion 3 may be configured by a single insert, or may be configured by coaxially overlaying three or more inserts with each other.

The number of insertion holes provided in each of the inserts 4 and 5 of the above-described embodiment is not limited to four, but it is preferable that a plurality of insertion holes be provided around the shaft holes 41 and 81. Further, in the above-described embodiment, the insert 4 or 5 is fixed to the attachment face 90 or 190 of the body 2A or 2B using the four screws 8, but the insert 4 or 5 may be fixed in another method so as to be attachable and detachable. For example, the insert may be fixed to the body using a single bolt. Although not shown in the drawings, in this type, a boss is caused to protrude from the shaft hole of the insert arranged on the attachment face of the body, and a shaft portion of the bolt is screwed in a screw hole provided in the leading end of the boss. In this way, a head portion of the bolt engages with the face of the insert that is on the opposite side to the face of the insert that is in contact with the attachment face, and thus, similarly to the above-described embodiment, the insert can be fixed to the attachment face of the body.

In the above-described embodiment, the number of convex portions and the number of concave portions that are provided in each of the inserts 4 and 5 are each eight, but the numbers are not limited to this, as long as the numbers are the same.

In the above-described embodiment, for example, as shown in FIG. 8, the leading end portions of the convex portions 61 to 68 provided on the mating face of the insert 5 are configured so as not to be in contact with the bottom portions of the concave portions 31 to 38 provided in the mating face of the insert 4, but the leading end portions of the convex portions 61 to 68 may be in contact with the bottom portions of the concave portions 31 to 38. Further, in reverse to that, the leading end portions of the convex portions 61 to 68 provided on the mating face of the insert 5 may be in contact with the bottom portions of the concave portions 31 to 38 provided in the mating face of the insert 4, and the leading ends of the convex portions 21 to 28 provided on the mating face of the insert 4 may be configured so as not to be in contact with the bottom portions of the concave portions 71 to 78 provided in the mating face of the insert 5.

Further, as shown in FIG. 18, the leading end portions of the convex portions 61 to 68 provided on the other face 50B of the insert 5 are configured so as not to be in contact with the bottom portions of the concave portions 101 to 108 provided in the attachment face 90 of the body 2A, but the leading end portions of the convex portions 61 to 68 may be in contact with the bottom portions of the concave portions 101 to 108. Further, as shown in FIG. 19, the leading end portions of the convex portions 21 to 28 provided on the other face 10B of the insert 4 are in contact with the bottom portions of the concave portions 201 to 208 provided in the attachment face 190 of the body 2B, but the leading end portions of the convex portions 21 to 28 may be configured so as not to be in contact with the bottom portions of the concave portions 201 to 208.

In the above-described embodiment, the method for cutting the right-hand thread in the inner peripheral surface of the hole 6 provided in the workpiece 7 is explained using FIG. 18 to FIG. 21, but when cutting a left-hand thread, it is sufficient to reverse the rotation direction of the tool and reverse the orientation of the spiral when causing the main shaft to move in the spiral manner, in the cutting processes of each of the right-hand cut down-cut milling, the right-hand cut up-cut milling, the left-hand cut down-cut milling, and the left-hand cut up-cut milling.

In the above-described embodiment, the spacer 300 shown in FIG. 26 includes the four vane portions 311 to 314, but there is no limit on the number of vane portions.

The invention claimed is:

1. An insert type tool comprising:
a cylindrical body that extends in an axial direction;
a disc-shaped insert portion; and
a fixing device that detachably fixes the insert portion to one end portion in the axial direction of the body, wherein
the insert portion can be configured by a single disc-shaped insert or by a plurality of the inserts coaxially overlaid with each other, an outer periphery of the insert including blade portions for machining and the insert having two faces that are arranged parallel in a thickness direction thereof, one of the faces being a front face at a front side of the insert and the other of the faces being a back face at a back side of the insert,
the insert, on the front face and the back face, comprises:
convex portions respectively protruding from a center in the thickness direction of the insert to both of the front and back sides in the thickness direction, the convex portions being most separated from the center; and
concave portions provided in sections excluding the convex portions, the concave portions respectively protruding from the center to the both of the front and back sides in the thickness direction, and the concave portions being lower than the convex portions such that a thickness of the concave portions, which is determined in the thickness direction, is smaller than a thickness of the convex portions, and
when the plurality of the inserts are coaxially overlaid with each other wherein one of the inserts mates with another of the inserts at a mating face, on each of the mating faces of all the inserts that are overlaid with each other, convex portions provided on a mating face of a first insert are inserted in concave portions provided in a mating face of a second insert, and the convex portions provided on the mating face of the second insert are inserted in the concave portions provided in the mating face of the first insert, the first insert being one insert of adjacent two of the inserts, and the second insert being another insert of the adjacent two of the inserts, and
the blade portions are disposed at only outer peripheries of the convex portions such that no blade portion is disposed at outer peripheries of the concave portions.

2. The insert type tool according to claim 1, wherein the convex portions are provided between the blade portions and a center portion of the insert.

3. The insert type tool according to claim 1, wherein
a shaft hole is provided in the center portion of the insert, the shaft hole penetrating in the thickness direction,
a contact face is provided on the one end portion of the body, the contact face being in contact with one face of the insert, and
a boss is provided in a center portion of the contact face, the boss protruding along the axial direction of the body, and the boss being inserted in the shaft hole.

4. The insert type tool according to claim 3, wherein the contact face comprises:
body side convex portions protruding to the one face side in positions corresponding to the concave portions provided in the one face, the body side convex portions being inserted in the concave portions; and
body side concave portions provided to be lower than the body side convex portions in positions corresponding to the convex portions provided on the one face, the convex portions being inserted in the body side concave portions.

5. The insert type tool according to claim 4, wherein
the fixing device is a screw,
an insertion hole is provided in the insert, the insertion hole penetrating in the thickness direction, and a shaft portion of the screw being to be inserted in the insertion hole, and
a screw hole is provided in the contact face in a position corresponding to the insertion hole, the screw being to be tightened in the screw hole.

6. The insert type tool according to claim 1, wherein
leading end portions of the convex portions provided on the mating face of the first insert are in contact with bottom portions of the concave portions provided in the mating face of the second insert, and
leading end portions of the convex portions provided on the mating face of the second insert are not in contact with bottom portions of the concave portions provided in the mating face of the first insert.

7. The insert type tool according to claim 1, wherein
on each of the front and back faces of the insert,
the number of the convex portions and the number of the concave portions are the same number n, and
when a minimum angle indicated by two first virtual straight lines when the two first virtual straight lines from the center portion of the insert contact outermost peripheral edge portions of the convex portion and include a whole of the convex portion between the two first virtual straight lines is X, and a maximum angle between two second virtual straight lines when the two second virtual straight lines from the center portion contact outermost peripheral edge portions of the concave portion and do not include the convex portion between the two second virtual straight lines is Y, then:
X is less than Y,
a sum of Xs of then number of convex portions is less than 180°,
a sum of Ys of the n number of concave portions is greater than 180°,
among Xs of the n number of convex portions, a maximum angle $X_{max}$ is less than 180/n°, and
among Ys of the n number of concave portions, a maximum angle $Y_{max}$ is greater than 180/n°.

8. The insert type tool according to claim 1, wherein the insert portion is configured by coaxially overlaying a rough machining insert and a finish machining insert with each other, the rough machining insert being the insert including blade portions to be used for rough machining, and the finish machining insert being the insert including blade portions to be used for finish machining.

9. The insert type tool according to claim 1, wherein when the insert portion is configured by overlaying a plurality of the inserts, a pitch is adjustable by replacing one of the inserts with an insert having a different thickness, the pitch being a distance in a direction parallel to the axial direction between blade portions provided on a periphery of the first insert and blade portions provided on a periphery of the second insert.

10. The insert type tool according to claim 1, further comprising:

a plate-shaped spacer placed between the first insert and the second insert.

11. A thread mill, comprising:
the configuration of the insert type tool according to claim 1.

* * * * *